(12) United States Patent
Zhang et al.

(10) Patent No.: US 12,133,037 B2
(45) Date of Patent: Oct. 29, 2024

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/820,886

(22) Filed: Aug. 19, 2022

(65) Prior Publication Data
US 2022/0408172 A1    Dec. 22, 2022

Related U.S. Application Data

(63) Continuation of application No. 17/141,264, filed on Jan. 5, 2021, now Pat. No. 11,445,281, which is a (Continued)

(30) Foreign Application Priority Data

| Apr. 30, 2019 | (CN) | 201910364346.2 |
| Sep. 19, 2019 | (CN) | 201910888067.6 |
| Sep. 19, 2019 | (CN) | 201910888762.2 |

(51) Int. Cl.
*H04R 1/02*    (2006.01)
*G02C 11/00*    (2006.01)
(Continued)

(52) U.S. Cl.
CPC ......... *H04R 1/1016* (2013.01); *G02C 11/00* (2013.01); *G02C 11/10* (2013.01); *G06F 3/16* (2013.01);
(Continued)

(58) Field of Classification Search
CPC .......... H04R 1/02; H04R 1/026; H04R 1/028; H04R 1/10; H04R 1/105; H04R 1/1008;
(Continued)

(56) References Cited

U.S. PATENT DOCUMENTS

| 2010/0246864 A1 | 9/2010 | Hildebrandt et al. |
| 2010/0310106 A1 | 12/2010 | Blanchard et al. |

(Continued)

FOREIGN PATENT DOCUMENTS

| CN | 201426167 Y | 3/2010 |
| CN | 204810512 U | 11/2015 |

(Continued)

OTHER PUBLICATIONS

International Search Report in PCT/CN2019/130880 mailed on Apr. 1, 2020, 6 pages.

(Continued)

*Primary Examiner* — Paul Kim
(74) *Attorney, Agent, or Firm* — METIS IP LLC

(57) ABSTRACT

The present disclosure relates to an acoustic output apparatus. The acoustic output apparatus comprising: at least one low-frequency acoustic driver that outputs sound from at least two first sound guiding holes; at least one high-frequency acoustic driver that outputs sound from at least two second sound guiding holes; and a controller configured to cause the low-frequency acoustic driver to output sound in a first frequency range, and cause the high-frequency acoustic driver to output sound in a second frequency range, wherein the second frequency range includes frequencies higher than the first frequency range.

19 Claims, 10 Drawing Sheets

Related U.S. Application Data continuation of application No. PCT/CN2019/130880, filed on Dec. 31, 2019.

(51) Int. Cl.

| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/10* | (2006.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .. H04R 1/1016; H04R 1/1025; H04R 1/1041; H04R 1/1075; H04R 1/1083; H04R 1/22; H04R 1/24; H04R 1/245; H04R 1/26; H04R 1/28; H04R 1/2803; H04R 1/2807; H04R 1/2811; H04R 1/2896; H04R 1/34; H04R 1/342; H04R 1/345; H04R 1/347; H04R 1/38; H04R 1/44; H04R 3/00; H04R 3/005; H04R 3/02; H04R 5/02; H04R 5/033; H04R 5/0335; H04R 9/06; H04R 2201/103; H04R 2410/05; H04R 2420/07; H04R 1/2873; H04R 3/04; H04R 3/14; H04R 2499/11; G06F 3/16; G06F 3/162; G06F 3/165; H04M 1/03; H04M 1/035; H04M 1/78; H04M 1/6016; H04M 1/6058; H04W 4/80; G10L 21/038; G10L 21/0208; G10L 2021/02166; H04S 2400/11; H04S 7/304; G02C 11/00; G02C 11/06; G02C 11/10
USPC ......................................................... 381/182
See application file for complete search history.

(56) References Cited

U.S. PATENT DOCUMENTS

| | | | |
|---|---|---|---|
| 2012/0177206 A1* | 7/2012 | Yamagishi | H04R 1/345 381/26 |
| 2013/0051585 A1 | 2/2013 | Karkkainen et al. | |
| 2013/0266170 A1 | 10/2013 | Yamagishi | |
| 2016/0205458 A1 | 7/2016 | Huang et al. | |
| 2017/0201823 A1* | 7/2017 | Shetye | H04R 1/347 |
| 2018/0167710 A1* | 6/2018 | Silver | H04R 1/1075 |
| 2019/0052954 A1 | 2/2019 | Rusconi Clerici Beltrami et al. | |
| 2019/0238971 A1* | 8/2019 | Wakeland | H04R 1/347 |
| 2021/0243518 A1 | 8/2021 | Zhang et al. | |

FOREIGN PATENT DOCUMENTS

| | | |
|---|---|---|
| CN | 107231585 A | 10/2017 |
| CN | 206575566 U | 10/2017 |
| CN | 207939700 U | 10/2018 |

OTHER PUBLICATIONS

Written Opinion in PCT/CN2019/130880 mailed on Apr. 1, 2020, 8 pages.

* cited by examiner

ACOUSTIC OUTPUT APPARATUS

CROSS-REFERENCE TO RELATED APPLICATIONS

This application is a continuation of U.S. patent application Ser. No. 17/141,264, filed on Jan. 5, 2021, which is a continuation of International Application No. PCT/CN2019/130880, filed on Dec. 31, 2019, which claims priority of the Chinese Application No. 201910888067.6 filed on Sep. 19, 2019, priority of Chinese Application No. 201910888762.2 filed on Sep. 19, 2019, and priority of the Chinese Application No. 201910364346.2 filed on Apr. 30, 2019, the entire contents of each of which are hereby incorporated reference.

TECHNICAL FIELD

The present disclosure relates to the field of acoustics, particularly, relates to an acoustic output apparatus.

BACKGROUND

An open binaural acoustic output apparatus is a portable audio output device apparatus that facilitates sound conduction within a specific range of a user. Compared with traditional in-ear and over-ear headphones, the open binaural acoustic output apparatus may have the characteristics of not blocking and covering the ear canal, allowing users to obtain sound information in an ambient environment while listening to music, improving safety and comfort. Due to the use of the open structure, a sound leakage of the open binaural acoustic output apparatus may be more serious than that of traditional headphones. At present, it is common practice in the industry to use two or a plurality of sound sources to construct a specific sound field and adjust a sound pressure distribution to reduce sound leakage. Although this method can achieve the effect of reducing sound leakage of a certain extent, it still has certain limitations. For example, while suppressing sound leakage, this method will also reduce the volume of the sound sent to the user. Moreover, since the wavelength of different frequency sounds is different, the method has a weak suppression effect on high-frequency leakage.

Therefore, it is desirable to provide an acoustic output apparatus for increasing the user's listening volume and reducing leakage.

SUMMARY

One of the present disclosure embodiments provides an acoustic output apparatus. The acoustic output apparatus comprising: at least one low-frequency acoustic driver that outputs sound from at least two first sound guiding holes; at least one high-frequency acoustic driver that outputs sound from at least two second sound guiding holes; and a controller configured to cause the low-frequency acoustic driver to output sound in a first frequency range, and cause the high-frequency acoustic driver to output sound in a second frequency range, wherein the second frequency range includes frequencies higher than the first frequency range.

In some embodiments, there may be a first distance of the two first sound guiding holes, a second distance of the two second sound guiding holes, and the first distance is greater than the second distance.

In some embodiments, the first distance may be not greater than 40 mm, and the second distance may be not greater than 7 mm.

In some embodiments, the first distance may be at least two times greater than the second distance.

In some embodiments, the first frequency range includes frequencies below 650 Hz, and the second frequency range includes frequencies above 1000 Hz.

In some embodiments, the first frequency range and the second frequency range overlap.

In some embodiments, the controller comprising: an electronic frequency division module, configured to divide a frequency of a sound source signal to generate a low-frequency signal corresponding to the first frequency range and a high-frequency signal corresponding to the second frequency range; wherein the low-frequency signal drives the at least one low-frequency acoustic driver to generate sound, and the high-frequency signal drives the at least one high-frequency acoustic driver to generate sound.

In some embodiments, the electronic frequency division module comprises at least one of a passive filter, an active filter, an analog filter, and a digital filter.

In some embodiments, the at least one low-frequency acoustic driver includes a first transducer, and the at least one high-frequency acoustic driver includes a second transducer; wherein the first transducer and the second transducer have different frequency response characteristics.

In some embodiments, the first transducer includes a low-frequency speaker, and the second transducer includes a high-frequency speaker.

In some embodiments, a first acoustic route may be formed between the at least one low-frequency acoustic driver and the at least two first sound guiding holes; a second acoustic route may be formed between the at least one high-frequency acoustic driver and the at least two second sound guiding holes, and the first acoustic route and the second acoustic route have different frequency selection characteristics.

In some embodiments, the first acoustic route includes an acoustic resistance material. An acoustic impedance of the acoustic resistance material may be in a range from 5 MKS Rayleigh to 500 MKS Rayleigh.

In some embodiments, the acoustic output apparatus includes a supporting structure configured to carry the at least one high-frequency acoustic driver and the at least one low-frequency acoustic driver, so that the at least two first sound guiding holes and the at least two second sound guiding holes are positioned away from the user's ear.

In some embodiments, the at least two second sound guiding holes are located closer to the user's ear than the at least two first sound guiding holes.

In some embodiments, the at least two first sound guiding holes and the at least two second sound guiding holes are located on the supporting structure.

In some embodiments, the low-frequency acoustic driver may be packaged by a casing, the casing forming a front chamber and a rear chamber of the low-frequency acoustic driver.

In some embodiments, the front chamber of the low-frequency acoustic driver may be acoustically coupled to one of the at least two first sound guiding holes; the rear chamber may be acoustically coupled to another first sound guiding hole.

In some embodiments, the high-frequency acoustic driver may be packaged by a casing, the casing forming a front chamber and a rear chamber of the high-frequency acoustic driver.

In some embodiments, the front chamber of the high-frequency acoustic driver may be acoustically coupled to one of the at least two second sound guiding holes; the rear chamber of the high-frequency acoustic driver may be acoustically coupled to another second sound guiding hole.

In some embodiments, the sound output from the at least two first sound guiding holes may be in opposite phases.

One of the present disclosure embodiments provides an acoustic output method. The method comprising: obtaining the sound source signal; dividing frequency of the sound source signal to generate at least one set of high-high-frequency signals and at least one set of low-frequency signals; outputting sound from at least two first sound guiding holes by at least one low-frequency acoustic driver based on the at least one set of low-frequency signals; and outputting sound from at least two second sound guiding holes by at least one high-high-frequency acoustic driver based on the at least one set of high-high-frequency signals, wherein there may be a first distance of the two first sound guiding holes, a second distance of the two second sound guiding holes, and the first distance may be greater than the second distance.

BRIEF DESCRIPTION OF THE DRAWINGS

The present disclosure is further illustrated in terms of exemplary embodiments. These exemplary embodiments are described in detail with reference to the drawings. These examples are not restrictive. In these examples, the same number indicates the same structure, wherein.

DETAILED DESCRIPTION

Figure 1:
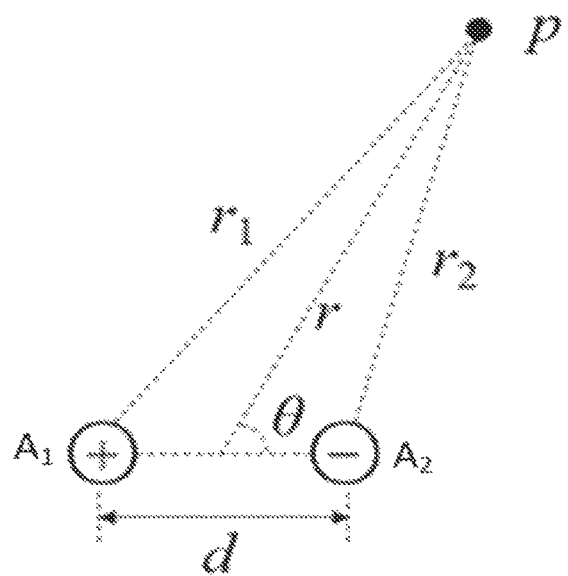
FIG. 1 is a schematic diagram illustrating exemplary two point sound sources according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, section or assembly of different level in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments of the present disclosure. It should be noted that the foregoing or the following operations may not be performed in the order accurately. Instead, the steps may be processed in reverse order or simultaneously. Moreover, other operations may also be added into these procedures, or one or more steps may be removed from these procedures.

The present disclosure provides an acoustic output apparatus. When the user wears the acoustic output apparatus, the acoustic output apparatus may be located at least on one side of the user's head, close but not blocking the user's ear. The acoustic output apparatus may be worn on the head of the user (for example, a non-in-ear open headset worn with glasses, a headband, or other structural means), or worn on other body parts of the user (such as the neck/shoulder region of the user), or placed near the ears of user by other means (such as the way the user holds it). The acoustic output apparatus may include at least two groups of acoustic drivers, including at least one group of high-frequency acoustic drivers and one group of low-frequency acoustic drivers. Each group of acoustic driver may be used to generate a sound with a certain frequency range, and the sound may be transmitted outward through at least two sound guiding holes acoustically coupled with it.

FIG. 1 is a schematic diagram illustrating exemplary two point sound sources according to some embodiments of the present disclosure. In order to further explain the effect of the setting of the sound guiding holes on the acoustic output apparatus on the acoustic output effect of the acoustic output apparatus, and considering that the sound may be regarded as propagating outwards from the sound guiding holes, the present disclosure may describe the sound guiding holes on the acoustic output apparatus as sound sources for externally outputting sound.

Just for the convenience of description and for the purpose of illustration, when sizes of the sound guiding holes on the acoustic output apparatus are small, each sound guiding hole may be approximately regarded as a point sound source. In some embodiments, any sound guiding holes provided on the acoustic output apparatus for outputting sound may be approximated as a single point sound source on the acoustic output apparatus. The sound field pressure p generated by a single point sound source may satisfy Equation (1):

$$p = \frac{j\omega\rho_0}{4\pi r} Q_0 \exp j(\omega t - kr), \qquad (1)$$

where $\omega$ denotes an angular frequency, $\rho_0$ denotes an air density, r denotes a distance between the target point and the sound source, $Q_0$ denotes a volume velocity of the sound source, and k denotes a wave number. It may be concluded that the magnitude of the sound field pressure of sound field of the point sound source is inversely proportional to the distance to the point sound source.

It should be noted that, the sound guiding hole for outputting sound as point sound source may only serve as an explanation of the principle and effect of the present disclosure, and may not limit the shape and size of the sound guiding hole in practical applications. In some embodiments, if an area of the sound guiding hole is large, the sound guiding hole may also be equivalent to a planar acoustic source. In some embodiments, the point sound source may also be realized by other structures, such as a vibration surface and a sound radiation surface. For those skilled in the art, without creative activities, it may be known that sounds generated by structures such as sound guiding holes, vibration surfaces, and acoustic radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by "acoustic driver outputs sound from at least two first sound guiding holes" described in the present disclosure may also achieve the same effect by other acoustic structures, for example, "at least two acoustic drivers each of which outputs sound from at least one acoustic radiation surface". According to actual situations, other acoustic structures may be selected for adjustment and combination, and the same acoustic output effect may also be achieved. The principle of radiating sound outward with structures such as surface sound sources may be similar to that of point sound sources, and may not be repeated here.

As mentioned above, at least two sound guiding holes corresponding to the same acoustic driver may be set on the acoustic output apparatus provided in the specification. In this case, the two point sound sources may be formed, which may reduce sound transmitted to the surrounding environment. For convenience, the sound output from the acoustic output apparatus to the surrounding environment may be referred to as far-field leakage since it may be heard by others in the environment. The sound output from the acoustic output apparatus to the ears of the user wearing the acoustic output apparatus may also be referred to as near-field sound since a distance between the acoustic output apparatus and the user may be relatively short. In some embodiments, the sound outputs from two sound guiding holes (i.e., the two point sound sources) have a certain phase difference. When the position and phase difference of the two point sound sources meet certain conditions, the acoustic output apparatus may output different sound effects in the near-field (for example, the position of the user's ear) and the far-field. For example, if the phases of the point sound sources corresponding to the two sound guiding holes are opposite, that is, an absolute value of the phase difference between the two point sound sources may be 180 degrees, the far-field leakage may be reduced according to the principle of reversed phase cancellation.

As shown in FIG. 1, a sound pressure p in the sound field generated by two point sound sources may satisfy the following Equation (2):

$$p = \frac{A_1}{r_1} \exp j(\omega t - kr_1 + \varphi_1) + \frac{A_2}{r_2} \exp j(\omega t - kr_2 + \varphi_2), \qquad (2)$$

where, $A_1$ and $A_2$ denote intensities of the two point sound sources, $\varphi_1$ and $\varphi_2$ denote phases of the two point sound sources, respectively, d denotes a distance between the two point sound sources, and $r_1$ and $r_2$ may satisfy Equation (3):

$$\begin{cases} r_1 = \sqrt{r^2 + \left(\frac{d}{2}\right)^2 - 2 \times r \times \frac{d}{2} \times \cos\theta} \\ r_2 = \sqrt{r^2 + \left(\frac{d}{2}\right)^2 + 2 \times r \times \frac{d}{2} \times \cos\theta} \end{cases}, \qquad (3)$$

where, r denotes a distance between any target point and the center of the two point sound sources in the space, and $\theta$ denotes an angle between a line connecting the target point and the center of the two point sound sources and another line on which the two point sound sources may be located.

According to Equation (3), the sound pressure p of the target point in the sound field may relate to the intensity of each point sound source, the distance d, the phases of the two point sound sources, and the distance to the two point sound sources.

Two point sound sources with different output effects may be formed through different settings of sound guiding holes. In this case, the volume of near-field sound may be improved, and the leakage of the far-field may be reduced. For example, an acoustic driver may include a vibration diaphragm. When the vibration diaphragm vibrates, sounds may be transmitted from the front and rear sides of the vibration diaphragm, respectively. The front side of the vibration diaphragm in the acoustic output apparatus may be provided with a front chamber for transmitting sound. The front chamber may be coupled with a sound guiding hole acoustically. The sound transmitted from the front side of the vibration diaphragm may be transmitted to the sound guiding hole through the front chamber and further transmitted outwards. The rear side of the vibration diaphragm in the acoustic output apparatus may be provided with a rear chamber for transmitting sound. The rear chamber may be coupled with another sound guiding hole acoustically, and the sound transmitted from the rear side of the vibration diaphragm may be transmitted to the sound guiding hole through the rear chamber and propagate further outwards. It should be noted that, when the vibration diaphragm vibrating, the front side and the rear side of the vibration diaphragm may generate sound with opposite phases, respectively. In some embodiments, the structures of the front chamber and rear chamber may be specially set so that the sound output by the acoustic driver at different sound guiding holes may meet specific conditions. For example, lengths of the front chamber and the rear chamber may be specially designed such that sound with a specific phase relationship (e.g., opposite phases) may be output at the two sound guiding holes. As a result, problems that the acoustic output apparatus has a low volume in the near-field and the sound leaks in the far-field may be effectively resolved.

Figure 2:
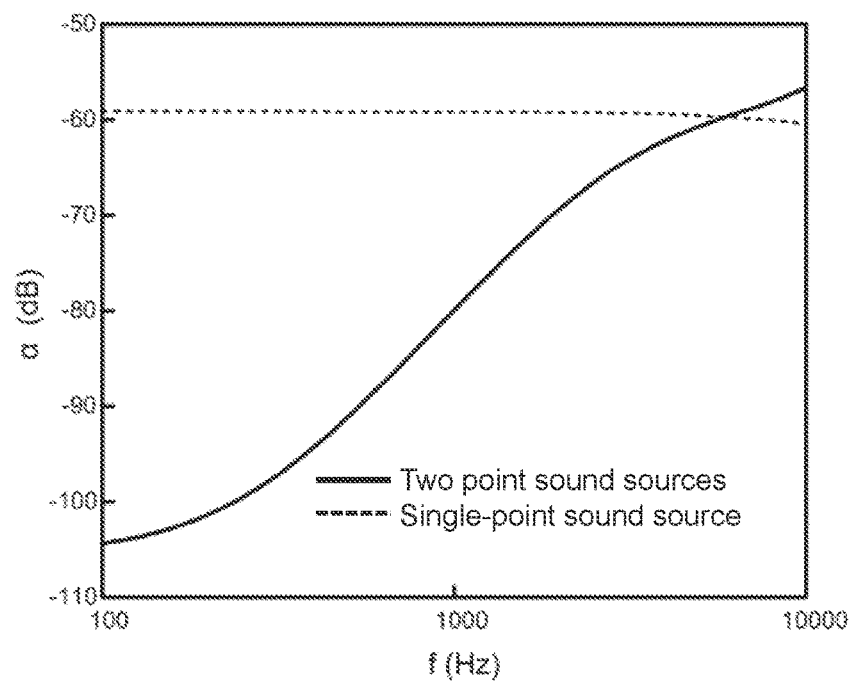
FIG. 2 is a schematic diagram illustrating variations of sound leakage of two point sound sources and a single point sound source as a function of frequency according to some embodiments of the present disclosure.

FIG. 2 is a schematic diagram illustrating variations of sound leakage of two point sound sources and a single point sound source as a function of frequency according to some embodiments of the present disclosure.

Under certain conditions, compared to a volume of the far-field leakage of a single point sound source, the volume of the far-field leakage of the two point sound sources may increase with the frequency. In other words, the leakage reduction capability of the two point sound sources in the far-field may decrease with the frequency increases. For further description, a curve of far-field leakage with frequency may be described in connection with FIG. 2.

Distance between the two point sound sources in FIG. 2 may be fixed, and the two point sound sources may have a same amplitude and opposite phases. The dotted line may indicate a variation curve of a volume of the single point sound source at different frequencies. The solid line may indicate a variation curve of a volume of the leaked sound of the two point sound sources at different frequencies. The abscissa of the diagram may represent the frequency (f) of the sound, and the unit may be Hertz (Hz). The ordinate of the diagram may use a normalization parameter a to evaluate the volume of the leaked sound. The calculation equation of parameter a may be as follows:

$$\alpha = \frac{|P_{far}|^2}{|P_{ear}|^2}, \tag{4}$$

where $P_{far}$ denotes the sound pressure of the acoustic output apparatus in the far-field (i.e., the sound pressure of the far-field sound leakage). $P_{ear}$ denotes the sound pressure around the user's ears (i.e., the sound pressure of the near-field sound). The larger the value of a, the larger the far-field leakage relative to the near-field sound heard may be, indicating that the capability of the acoustic output apparatus for reducing the far-field leakage may be worse.

As shown in FIG. 2, when the frequency is below 6000 Hz, the far-field leakage produced by the two point sound sources may be less than the far-field leakage produced by the single point sound source, and may increase as the frequency increases. When the frequency is close to 10000 Hz (for example, about 8000 Hz or above), the far-field leakage produced by the two point sound sources may be greater than the far-field leakage produced by the single point sound source. In some embodiments, a frequency corresponding to an intersection of the variation curves of the two point sound sources and the single point sound source may be determined as an upper limit frequency that the two point sound sources can reduce the leakage.

For illustrative purposes, when the frequency is relatively small (for example, in a range of 100 Hz to 1000 Hz), the capability of reducing sound leakage (i.e., the value of a may be small) of the two point sound sources may be relatively strong (below −80 dB). In such a frequency band, an increase of the volume of the heard sound may be determined as an optimization goal. When the frequency is relatively great, (for example, in a range of 1000 Hz to 8000 Hz), the capability of reducing sound leakage of the two point sound sources may be relatively weak (above −80 dB). In such a frequency band, a decrease of the sound leakage may be determined as the optimization goal.

In connection with FIG. 2, a frequency division point of the frequency may be determined through the variation tendency of the capability of the two point sound sources in reducing the sound leakage. Parameters of the two point sound sources may be adjusted according to the frequency division point so as to reduce the sound leakage of the acoustic output apparatus. For example, the frequency corresponding to a of a specific value (e.g., −60 dB, −70 dB, −80 dB, −90 dB, etc.) may be used as the frequency division point. Parameters of the two point sound sources may be determined by setting the frequency band below the frequency division point to improve the near-field sound, and setting the frequency band above the frequency division point to reduce far-field sound leakage. In some embodiments, a high-frequency band with a high-frequency (for example, sound output from a high-frequency acoustic driver) and a low-frequency band with a low frequency (for example, sound output from a low-frequency acoustic driver) may be determined based on the frequency division point. More details of the frequency division point may be disclosed elsewhere in the present disclosure (such as FIG. 5 and the descriptions thereof).

In some embodiments, the method for measuring and calculating the sound leakage may be adjusted according to the actual conditions. For example, an average value of amplitudes of the sound pressure of a plurality of points on a spherical surface centered by two point sound sources with a radius of 40 cm may be determined as the value of the sound leakage. As another example, one or more points of the far-field position may be taken as the position for measuring the sound leakage, and the sound volume of the position may be taken as the value of the sound leakage. As another example, a center of two point sound sources may be used as a center of a circle, and sound pressure amplitudes of two or more points evenly sampled according to a certain spatial angle in the far-field may be averaged, the average value may be taken as the value of the sound leakage. These measurement and calculation methods may be adjusted by those skilled in the art according to actual conditions and may be not intended to be limiting.

According to FIG. 2, it may be concluded that in the high-frequency band (higher frequency band determined according to the frequency division point), the two point sound sources may have a weak capability to reduce sound leakage, and in the low-frequency band (lower frequency band determined according to the frequency division point), the two point sound sources may have a strong capability to reduce sound leakage. At a certain sound frequency, the distance between the two point sound sources may be different, and its capability to reduce sound leakage may be different, and the difference between the volume of the heard sound and volume of the leaked sound may also be different. For a better description, the curve of the far-field leakage as a function of the distance between the two point sound sources may be described with reference to FIGS. 3A and 3B.

Figure 3A:
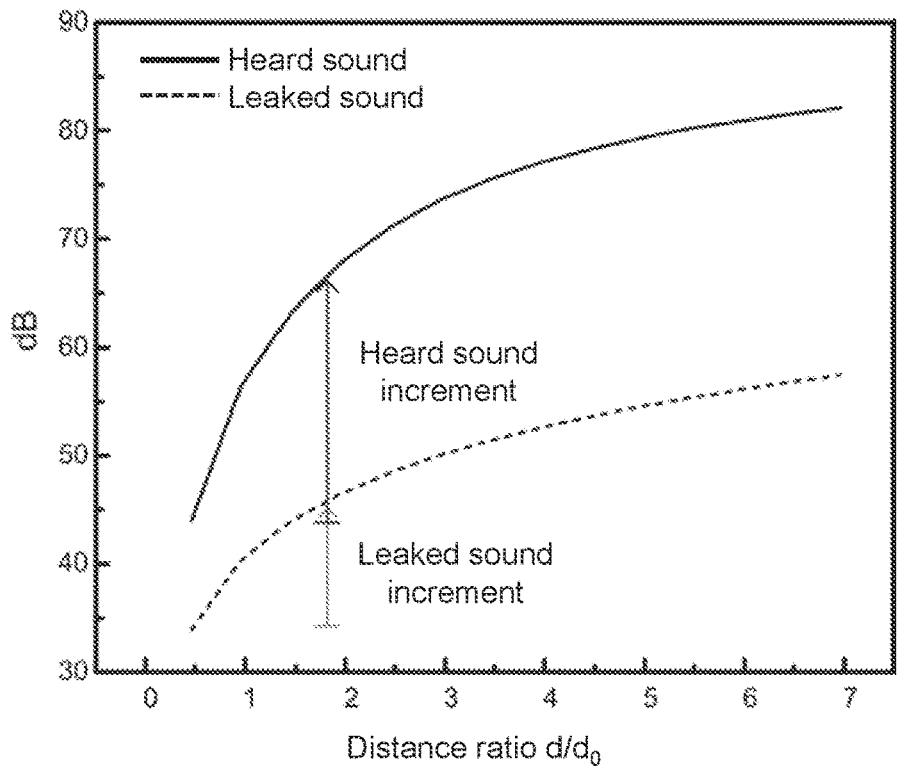
FIG. 3A is an exemplary graph illustrating a volume of the near-field sound and a volume of the far-field leakage as a function of the distance between two point sound sources according to some embodiments of the present disclosure.
Figure 3B:
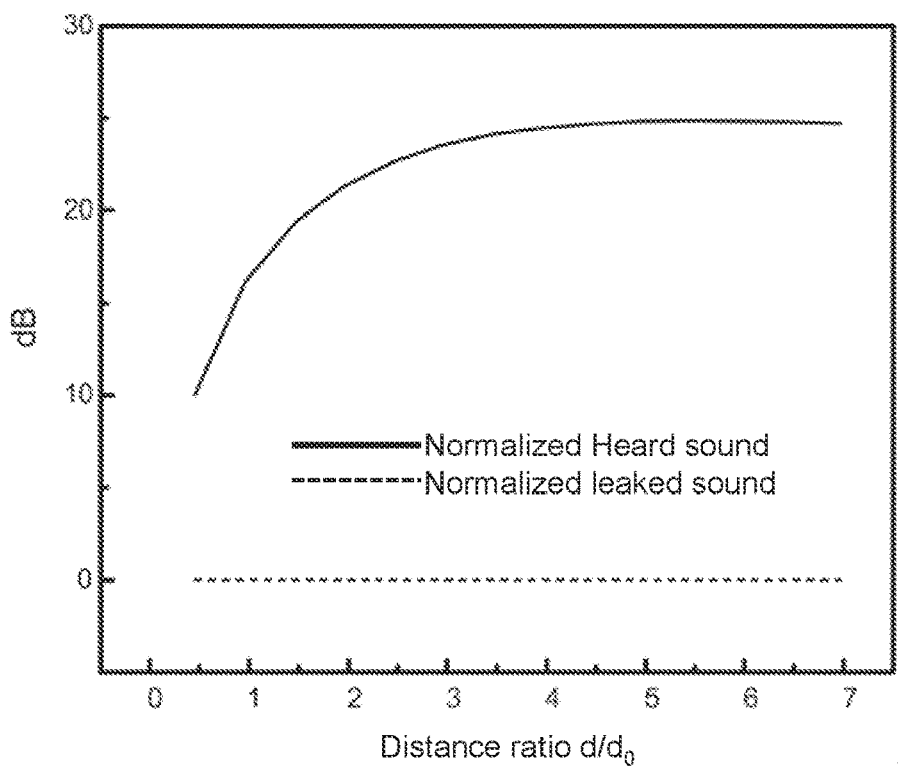
FIG. 3B is another exemplary graph illustrating a volume of the near-field sound and a volume of the far-field leakage as a function of the distance between the two point sound sources according to some embodiments of the present disclosure.

FIG. 3A is an exemplary graph illustrating a volume of the near-field sound and a volume of the far-field leakage as a function of the distance between the two point sound sources according to some embodiments of the present disclosure. FIG. 3B is another exemplary graph illustrating a volume of the near-field sound and a volume of the far-field leakage as a function of the distance between the two point sound sources according to some embodiments of the present disclosure.

FIG. 3B is a graph generated by performing a normalization on the graph in FIG. 3A.

In FIG. 3A, a solid line may represent a variation curve of the sound volume of the two point sound sources as a function of the distance between the two point sound sources, and the dotted line may represent the variation curve of the volume of the leaked sound of the two point sound sources as a function of the distance between the two point sound sources. The abscissa may represent the distance ratio $d/d_0$ between the distance d of the two point sound sources and the reference distance $d_0$, the ordinate may represent the sound volume (the unit may be decibel dB). The distance ratio $d/d_0$ may reflect a variation of the distance between the two point sound sources of two point sound sources. In some embodiments, the reference distance $d_0$ may be selected within a specific range. For example, $d_0$ may be a specific value in the range of 2.5 mm~10 mm, e.g., $d_0$ may be 5 mm. In some embodiments, the reference distance $d_0$ may be determined based on the listening position. For example, the distance between the listening position to the nearest point sound source may be taken as the reference distance $d_0$. It should be known that the reference distance $d_0$ may be flexibly selected from any other suitable values according to the actual conditions, which may be not limited here. Only merely by way of example, in FIG. 3A, $d_0$ may be 5 mm as a reference value for a variation of the distance of the two point sound sources.

When the sound frequency is constant, the volume of the heard sound and volume of the leaked sound of the two point sound sources may increase as the distance between the two point sound sources increases. When the distance ratio $d/d_0$ of the two point sound sources distance d to the reference distance $d_0$ may be less than a threshold value, an increase in the volume of the heard sound (i.e., heard sound increment) may be greater than an increase in the volume of the leaked sound (i.e., leaked sound increment) as the distance between two point sound sources increases. That is to say, the increase in the volume of the heard sound may be more significant than the increase in volume of the leaked sound. For example, as shown in FIG. 3A, when the distance ratio $d/d_0$ of the distance d of the two point sound sources and the reference distance $d_0$ may be two, the difference between the volume of the heard sound and the volume of the leaked sound may be about 20 dB. When the distance ratio $d/d_0$ is four, the difference between the volume of the heard sound and the volume of the leaked sound may be about 25 dB. In some embodiments, when the distance ratio $d/d_0$ of the distance d of the two point sound sources to the reference distance $d_0$ reaches a ratio threshold, the ratio of the volume of the heard sound to the volume of the leaked sound of the two point sound sources may reach a maximum value. At this time, as the distance of the two point sound sources further increases, the curve of the volume of the heard sound and the curve of the volume of the leaked sound may gradually go parallel, that is, the increase in volume of the heard sound and the increase in volume of the leaked sound may remain the same. For example, as shown in FIG. 3B, when the distance ratio $d/d_0$ of the two point sound sources may be 5, 6, or 7, the difference between the two point sound sources volume of the heard sound and the volume of the leaked sound may remain the same, both of which may be about 25 dB. That is, the increase in volume of the heard sound may be the same as the increase in volume of the leaked sound. In some embodiments, the ratio threshold of the distance ratio $d/d_0$ of the two point sound sources may be in the range of 0~7. For example, the ratio threshold of $d/d_0$ may be set in the range of 0.5~4.5. As another example, the ratio threshold of $d/d_0$ may be set in the range of 1~4.

In some embodiments, the ratio threshold value may be determined based on the variation of the difference between the volume of the heard sound and the volume of the leaked sound of the two point sound sources of FIG. 3A. For example, the ratio corresponding to the maximum difference between the volume of the heard sound and the volume of the leaked sound may be determined as the ratio threshold. As shown in FIG. 3B, when the distance ratio $d/d_0$ may be less than the threshold (e.g., four), a curve of normalized heard sound may show an upward trend (the slope of the curve may be larger than zero) as the distance between the two point sound sources increases. That is, the increase in heard sound volume may be greater than the increase in volume of the leaked sound. When the distance ratio $d/d_0$ may be greater than the threshold, the slope of the curve of the normalized heard sound may gradually approach zero as the distance between the two point sound sources increases, and parallel to a curve of normalized leaked sound. That is to say, the increase in volume of the heard sound may be no longer greater than the increase in volume of the leaked sound as the distance between the two point sound sources increases. According to the descriptions above, if the listening position is fixed, the parameters of the two point sound sources may be adjusted by certain means. It may be possible to achieve the effect that the volume of the near-field sound has a significant increase while the volume of the far-field leakage only increases slightly (i.e., the increase in the volume of the near-field sound may be greater than the volume of the far-field leakage). For example, two or more two point sound sources (such as a set of high-frequency two point sound sources and a set of low-frequency two point sound sources) are set, and the distance of each group of two point sound sources are adjusted by a certain means, so that the distance of the high-frequency two point sound sources may be less than the distance of the low-frequency two point sound sources. Since the low-frequency two point sound sources has a small sound leakage (the capability to reduce the sound leakage may be strong), the high-frequency two point sound sources have a large sound leakage (the capability to reduce the sound leakage may be weak). The volume of the heard sound may be significantly greater than the volume of the leaked sound if a smaller distance between the two point sound sources may be set in the high-frequency band, thereby reducing the sound leakage.

In some embodiments, there may be a certain distance between two sound guiding holes corresponding to each group of acoustic drivers, and the certain distance may affect the volume of the near-field sound transmitted to the wearer's ears and the volume of the far-field leakage transmitted to the environment by the acoustic output apparatus. In some embodiments, when the distance between the sound guiding holes corresponding to the high-frequency acoustic driver may be less than the distance between the sound guiding holes corresponding to the low-frequency acoustic driver, the volume of the sound heard by the user may be increased, and the sound leakage may be reduced, thereby preventing the sound from being heard by others near the user of the acoustic output apparatus. According to the above description, the acoustic output apparatus may be effectively used as an open earphone even in a relatively quiet environment.

Figure 4:
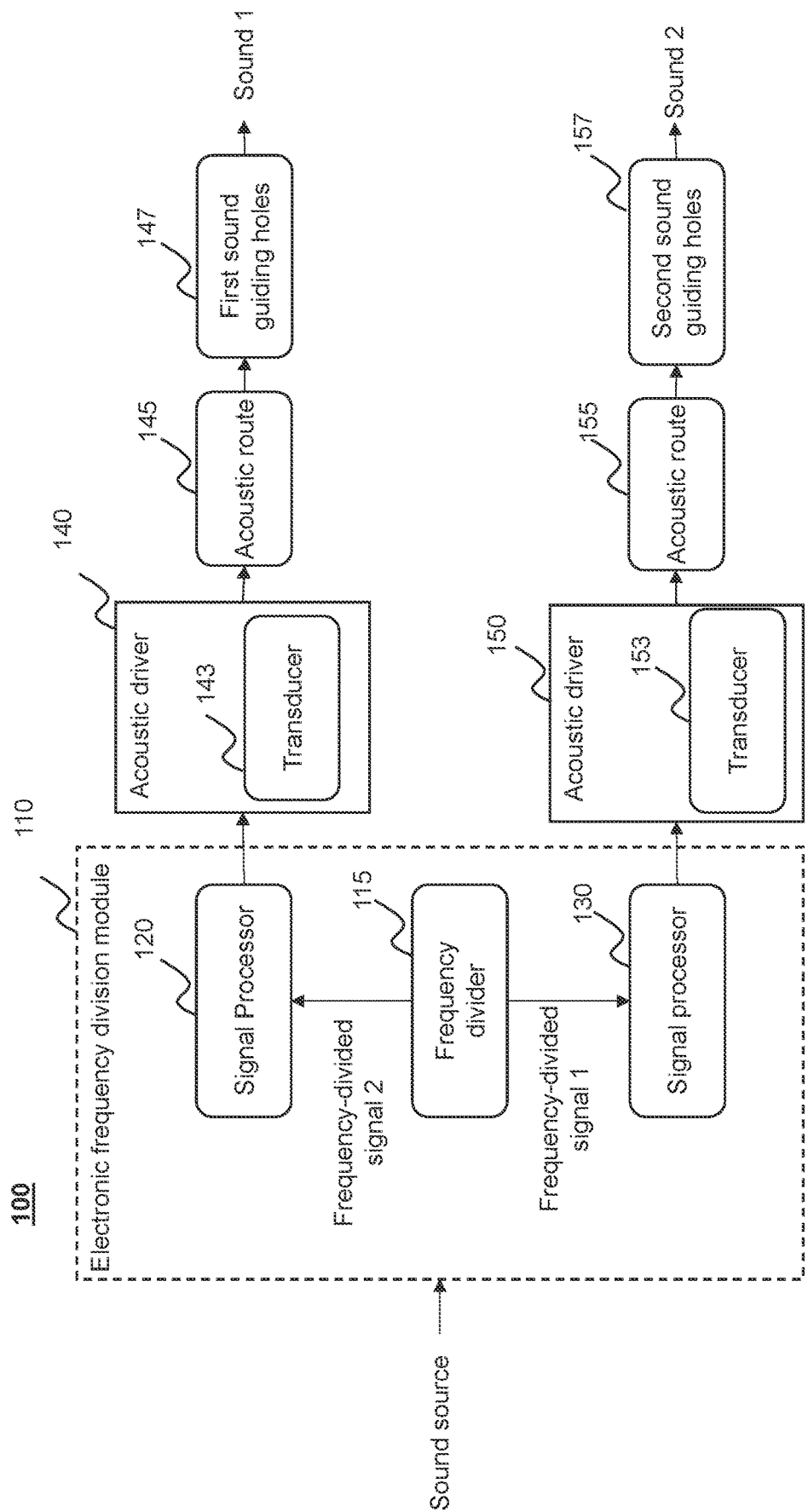
FIG. 4 is a schematic diagram illustrating an exemplary acoustic output apparatus according to some embodiments of the present disclosure.

FIG. 4 is a schematic diagram illustrating an exemplary acoustic output apparatus according to some embodiments of the present disclosure. As shown in FIG. 4, the acoustic output apparatus 100 may include an electronic frequency division module 110, an acoustic driver 140, an acoustic driver 150, an acoustic route 145, an acoustic route 155, at least two first sound guiding holes 147, and at least two second sound guiding holes 157. In some embodiments, the acoustic output apparatus 100 may further include a controller (not shown in the figure). The electronic frequency division module 110, as part of the controller, may be configured to generate electrical signals that are input into different acoustic drivers. The connection between different components in the acoustic output apparatus 100 may be wired or wireless. For example, the electronic frequency division module 110 may send signals to the acoustic driver 140 and/or the acoustic driver 150 through a wired transmission or a wireless transmission.

The electronic frequency division module 110 may divide the frequency of a source signal. The source signal may come from one or more sound source apparatuses (for example, a memory storing audio data) integrated in the acoustic output apparatus 100. The source signal may also be an audio signal that the acoustic output apparatus 100 received by a wired or wireless means. In some embodiments, the electronic frequency division module 110 may decompose the input source signal into two or more frequency-divided signals containing different frequencies. For example, the electronic frequency division module 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal.

For the purposes of description, the low-frequency signal described in the present disclosure may refer to sound signal with a frequency in a lower first frequency range. The high-frequency signal may refer to sound signal with a frequency in a higher second frequency range. The first frequency range and the second frequency range may or may not include overlapping frequency ranges. The second frequency range includes frequencies higher than the first frequency range. Merely by way of example, the first frequency range may refer to frequencies below the first frequency threshold. The second frequency range may refer to frequencies above the second frequency threshold. The first frequency threshold may be lower than the second frequency threshold, equal to the second frequency threshold, or higher than the second frequency threshold. For example, the first frequency threshold may be lower than the second frequency threshold (for example, the first frequency threshold may be 600 Hz and the second frequency threshold may be 700 Hz). That may mean there is no overlapping between the first frequency range and the second frequency range. As another example, the first frequency threshold may be equal to the second frequency (for example, both the first frequency threshold and the second frequency threshold may be 650 Hz or any other frequency values). As another example, the first frequency threshold may be higher than the second frequency threshold. That may indicate there is an overlapping between the first frequency range and the second frequency range. In this case, the difference value between the first frequency threshold and the second frequency threshold may not exceed a third frequency threshold. The third frequency threshold may be a fixed value, for example, 20 Hz, 50 Hz, 100 Hz, 150 Hz, or 200 Hz. The third frequency threshold may also be a value related to the first frequency threshold and/or the second frequency threshold (for example, 5%, 10%, 15%, etc. of the first frequency threshold). The third frequency threshold may be a value flexibly set by the user according to the actual scene, which may be not limited here. It should be noted that the first frequency threshold and the second frequency threshold may be flexibly set according to different situations, and are not limited herein.

In some embodiments, the electronic frequency division module 110 may include a frequency divider 115, a signal processor 120, and a signal processor 130. The frequency divider 115 may be used to decompose the source signal into two or more frequency-divided signals containing different frequency components. For example, a frequency-divided signal 1 with a high-frequency sound component and a frequency-divided signal 2 with a low-frequency sound component. In some embodiments, the frequency divider 115 may be an electronic device that may implement the signal decomposition function, including but not limited to one of a passive filter, an active filter, an analog filter, a digital filter, or any combination thereof. In some embodiments, the signal processor 120 or 130 may include one or more signal processing components. For example, the signal processor may include, but not limited to, an amplifier, an amplitude modulator, a phase modulator, a delayer, or a dynamic gain controller, or the like, or any combination thereof. Merely by way of example, the processing of the sound signal by the signal processor 120 and/or the signal processor 130 may include adjusting the amplitude corresponding to some frequencies in the sound signal. Specifically, in a case where the first frequency range and the second frequency range overlap, the signal processors 120 and 130 may adjust the intensity of the sound signal corresponding to the frequency in the overlapping frequency range (for example, reduce the amplitude of the signal corresponding to the frequency in the overlapping frequency range). This is to avoid excessive volume in the overlapping frequency range in the subsequent output sound caused by the superposition of multiple sound signals.

After the processing operations are performed by the signal processor 120 or 130, the frequency-divided signals may be transmitted to the acoustic drivers 140 and 150, respectively. In some embodiments, the sound signal transmitted into the acoustic driver 140 may be a sound signal including a lower frequency range (e.g., the first frequency range). Therefore, the acoustic driver 140 may also be referred to as a low-frequency acoustic driver. The sound signal transmitted into the acoustic driver 150 may be a sound signal including a higher frequency range (e.g., the second frequency range). Therefore, the acoustic driver 150 may also be referred to as a high-frequency acoustic driver. The acoustic driver 140 and the acoustic driver 150 may convert sound signals into a low-frequency sound and a high-frequency sound, respectively, then propagate the converted signals outwards.

In some embodiments, the acoustic driver 140 may be acoustically coupled to at least two first sound guiding holes (such as two first sound guiding holes 147) (for example, connected to the two first sound guiding holes 147 via two acoustic routes respectively). Then the acoustic driver 140 may propagate sound through the at least two first sound guiding holes. The acoustic driver 150 may be acoustically coupled to at least two second sound guiding holes (such as two second sound guiding holes 157) (For example, connected to the two second sound guiding holes 157 via two acoustic routes, respectively). Then the acoustic driver 150 may propagate sound through the at least two second sound guiding holes. In some embodiments, in order to reduce the far-field leakage of the acoustic output apparatus 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. According to the FIG. 2, FIG. 3A and FIG. 3B, further considering that the wavelength of the low-frequency sound is longer than that of the high-frequency sound, and in order to reduce the interference cancellation of the sound in the near-field (for example, the position of the user's ear), the distance between the first sound guiding holes and the distance between the second sound guiding holes may be set to be different values. For example, assuming that there is a first distance between the two first sound guiding holes and a second distance between the two second sound guiding holes, the first distance may be longer than the second distance. In some embodiments, the first distance and the second distance may be arbitrary values. Merely by way of example, the first distance may not be longer than 40 mm. For example, in the range of 20 mm-40 mm. The second distance may not be longer than 7 mm, for example, in the range of 3 mm-7 mm. More details of the first distance and second distance may be disclosed elsewhere in the present disclosure (such as FIG. 5 and the descriptions thereof).

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer may include, but not limited to, a transducer of a gas-conducting acoustic output apparatus, a transducer of a bone-conducting acoustic output apparatus, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (such as the low-frequency acoustic driver 140, the high-frequency acoustic driver 150) may include transducers with different properties or numbers. For example, each of the low-frequency acoustic driver 140 and the high-frequency acoustic driver 150 may include a transducer having different frequency response characteristics (such as a low-frequency speaker unit and a high-frequency speaker unit). As another example, the low-frequency acoustic driver 140 may include two transducers (such as two of the low-frequency speaker units), and the high-frequency acoustic driver 150 may include two transducers 153 (such as two of the high-frequency speaker units).

In some alternative embodiments, the acoustic output apparatus 100 may generate sound with different frequency ranges by other means. For example, transducer frequency division, acoustic route frequency division, or the like. When the acoustic output apparatus 100 uses a transducer or an acoustic route to divide the sound, the electronic frequency division module 110 (the part inside the dotted frame) may be omitted. The sound source signal may be input to the acoustic driver 140 and the acoustic driver 150, respectively.

In some embodiments, the acoustic output apparatus 100 may use a transducer to achieve signal frequency division. The acoustic driver 140 and the acoustic driver 150 may convert the input sound source signal into a low-frequency signal and a high-frequency signal, respectively. Specifically, through the transducer 143 (such as a low-frequency speaker), the low-frequency acoustic driver 140 may convert the source signal into the low-frequency sound with a low-frequency component. The low-frequency sound may be transmitted to the at least two first sound guiding holes 147 along at least two different acoustic routes. Then the low-frequency sound may be propagated outwards through the first sound guiding holes 147. Through the transducer 153 (such as a high-frequency speaker), the high-frequency acoustic driver 150 may convert the source signal into the high-frequency sound with high-frequency components. The high-frequency sound may be transmitted to the at least two second sound guiding holes 157 along at least two different acoustic routes. Then the high-frequency sound may be propagated outwards through the second sound guiding holes 157.

In some alternative embodiments, an acoustic route (e.g., the acoustic route 145 and the acoustic route 155) connecting a transducer and sound guiding holes may affect the nature of the transmitted sound. For example, an acoustic route may attenuate or change the phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route may also include an acoustic resistance material, which may have a specific acoustic impedance. For example, the acoustic impedance may be in the range of 5 MKS Rayleigh to 500 MKS Rayleigh. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output of the transducer may be acoustically filtered. In this case, the sounds output through different acoustic routes has different frequency components.

In some alternative embodiments, the acoustic output apparatus 100 may utilize acoustic routes to achieve signal frequency division. Specifically, the source signal may be input into a specific acoustic driver and converted into sound containing high and low-frequency components. The sound signal may be propagated along acoustic routes having different frequency selection characteristics. For example, the sound signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the sound signal may be propagated along the acoustic route with a high-pass characteristic to the corresponding sound guiding hole to generate high-frequency sound. In this process, the low-frequency sound may be absorbed or attenuated by the acoustic route with the high-pass characteristic.

In some embodiments, the controller in the acoustic output apparatus 100 may cause the low-frequency acoustic driver 140 to output sound in the first frequency range (i.e., low-frequency sound), and cause the high-frequency acoustic driver 150 to output sound in the second frequency range (i.e., high-frequency sound). In some embodiments, the acoustic output apparatus 100 may also include a supporting structure. The supporting structure may be used to carry the acoustic driver (such as the high-frequency acoustic driver 150, the low-frequency acoustic driver 140), so that the acoustic driver may be positioned away from the user's ear. In some embodiments, the sound guiding holes acoustically coupled with the high-frequency acoustic driver 150 may be located closer to an expected position of the user's ear (for example, the ear canal entrance), while the sound guiding hole acoustically coupled with the low-frequency acoustic driver 140 may be located further away from the expected position. In some embodiments, the supporting structure may be used to package the acoustic driver. The supporting structure of the packaged acoustic driver may be a casing made of various materials such as plastic, metal, and tape. The casing may encapsulate the acoustic driver and form a front chamber and a rear chamber corresponding to the acoustic driver. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. In some embodiments, the sound guiding holes (such as the first sound guiding holes 147 and the second sound guiding holes 157) may be disposed on the casing.

The above description of the acoustic output apparatus 100 may be merely by way of example. Those skilled in the art may make adjustments and changes to the structure, quantity, etc. of the acoustic driver, which is not limiting in the present disclosure. In some embodiments, the acoustic output apparatus 100 may include any number of the acoustic driver structures. For example, the acoustic output apparatus 100 may include two groups of the high-frequency acoustic drivers 150 and two groups of the low-frequency acoustic drivers 140, or one group of the high-frequency acoustic drives 150 and two groups of the low-frequency acoustic drivers 140, and these high-frequency/low-frequency drivers may be used to generate sound in a specific frequency range. As another example, the acoustic driver 140 and/or the acoustic driver 150 may include an additional signal processor. The signal processor may have the same or different structural components as the signal processor 120 or 130.

It should be noted that the acoustic output apparatus and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e.g., firmware).

It should be noted that the above description of the acoustic output apparatus 100 and its components is only for the convenience of description, and not intended to limit the scope of the present disclosure. It may be understood that, for those skilled in the art, after understanding the principle of the apparatus, it is possible to combine each unit or form a substructure to connect with other units arbitrarily without departing from this principle. For example, the electronic frequency division module 110 may be omitted, and the frequency division of the source signal may be implemented by the internal structure of the low-frequency acoustic driver 140 and/or the high-frequency acoustic driver 150. As another example, the signal processor 120 or 130 may be a part independent of the electronic frequency division module 110. Those modifications may fall within the scope of the present disclosure.

Figure 5:
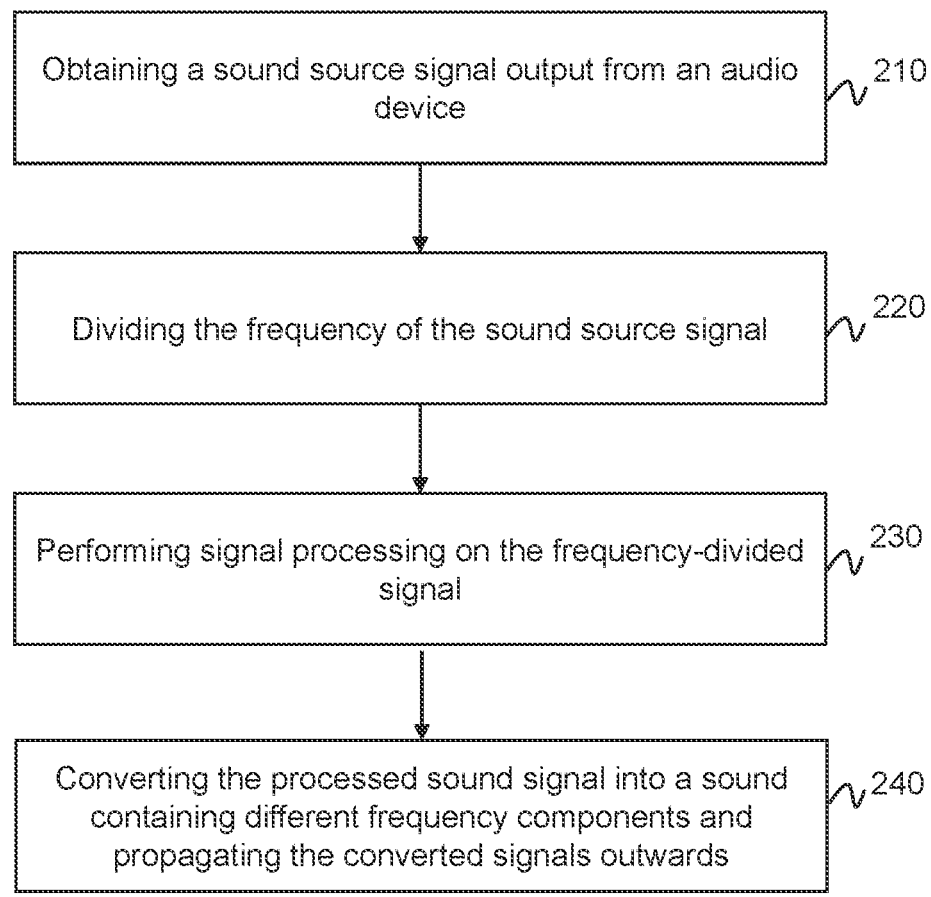
FIG. 5 is a flowchart illustrating an exemplary process for acoustic output according to some embodiments of the present disclosure.

FIG. 5 is a flowchart illustrating an exemplary process for acoustic output according to some embodiments of the present disclosure. In some embodiments, process 200 may be executed by the acoustic output apparatus (e.g., the acoustic output apparatus 100) disclosed in the present disclosure. The process 200 may be implemented as a set of instructions (e.g., an application program) stored in a storage device (e.g., ROM or RAM). A processing device (e.g., CPU and/or engine) in the acoustic output apparatus may execute the set of instructions. When the processing device executes the instruction, it may cause one or more components in the acoustic output apparatus to execute the process 200. The operations of the illustrated process presented below are intended to be illustrative. In some embodiments, the process 200 may be accomplished with one or more additional operations not described and/or without one or more of the operations discussed in the present disclosure. In addition, the order in which the operations of the process as illustrated in FIG. 5 and described below is not intended to be limiting. For the purpose of illustration, the following takes the acoustic output apparatus 100 as an example to describe the implementation of the process 200.

In 210, the acoustic output apparatus 100 may obtain a sound source signal output from an audio device.

In some embodiments, the acoustic output apparatus 100 may be connected to an audio device via a wired (for example, connected through a data cable) or wireless (for example, connected through a Bluetooth connection) connection, and receives the sound source signal. The audio device may include mobile devices, such as computers, mobile phones, wearable devices, or other carriers that may process or store the sound source data.

In 220, the acoustic output apparatus 100 may divide the frequency of the sound source signal.

The sound source signal may be decomposed into two or more sound signals containing different frequency components after the frequency division processing. For example, the sound source signal may be decomposed into a low-frequency signal with a low-frequency sound component and a high-frequency signal with a high-frequency sound component. In some embodiments, the low-frequency signal may refer to a sound signal with a frequency in a lower first frequency range, and the high-frequency signal may refer to a sound signal having a frequency in a higher second frequency range. In some embodiments, the first frequency range may include frequencies below 650 Hz, and the second frequency range may include frequencies above 1000 Hz. In some embodiments, the first frequency range may refer to frequencies below the first frequency threshold, and the second frequency range may refer to frequencies above the second frequency threshold. In some embodiments, the first frequency threshold may be lower than, equal to, or higher than the second frequency threshold. For example, the first frequency threshold may be 700 Hz, and the second frequency range is 800 Hz. More details of the high-frequency and low-frequency signals may be disclosed elsewhere in the present disclosure (such as FIG. 4 and the descriptions thereof).

In some embodiments, acoustic output apparatus 100 may divide the sound source signal through the electronic frequency division module 110. For example, the sound source signal may be decomposed into one or more groups of high-frequency signals and one or more groups of low-frequency signals by the electronic frequency division module 110.

In some embodiments, the acoustic output apparatus 100 may divide the sound source signal based on one or more frequency division points. The frequency division point may refer to a signal frequency distinguishing the first frequency range and the second frequency range. For example, when there is an overlapping frequency between the first frequency range and the second frequency range, the frequency division point may be a feature point within the overlapping frequency range (for example, a low-frequency boundary point, a high-frequency boundary point, a center frequency point, etc. of the overlapping frequency range). In some embodiments, the frequency division point may be determined according to a relationship between the frequency and the sound leakage of the acoustic output apparatus (for example, the curves shown in FIG. 2, FIGS. 3A and 3B). For example, considering that the acoustic leakage of the acoustic output apparatus changes with the frequency, the frequency point corresponding to the volume of the leaked sound satisfying a certain condition may be selected as the frequency division point, for example, 1000 Hz shown in FIG. 2. For more details about the change of the sound leakage volume with frequency, please refer to FIG. 2 and the descriptions thereof, which will not be repeated here. In some alternative embodiments, the user may specify a specific frequency as the frequency division point directly. For example, considering that the frequency range of sounds that the human ear may hear is 20 Hz-20 kHz, the user may select a frequency point in this range as the frequency division point. For example, the frequency division point may be 600 Hz, 800 Hz, 1000 Hz, 1200 Hz, or the like. In some embodiments, the frequency division point may be determined based on the performance of the acoustic driver. For example, considering that a low-frequency acoustic driver and a high-frequency acoustic driver have different frequency response curves, the frequency division point may be selected within a frequency range. The frequency range is above ½ of the higher limit frequency of the low-frequency acoustic driver and below two times the lower limit frequency of the high-frequency acoustic driver. More preferably, the frequency division point may be selected in a frequency range above ⅓ of the higher limit frequency of the low-frequency acoustic driver and below 1.5 times the lower limit frequency of the high-frequency acoustic driver.

In 230, the acoustic output apparatus 100 may perform signal processing on the frequency-divided signal.

In some embodiments, the acoustic output apparatus 100 may further process the frequency-divided signals (such as high-frequency signals and low-frequency signals) to meet the requirements of the subsequent output of sound. For example, the acoustic output apparatus 100 may further process the frequency-divided signal through a signal processor (such as the signal processor 120, the signal processor 130, or the like). The signal processor may include one or more signal processing components. For example, the signal processor may include, but not limited to, an amplifier, an amplitude modulator, a phase modulator, a delayer, a dynamic gain controller (DRC), or the like, or any combination thereof. Merely by way of example, the processing of the frequency-divided signal by the signal processor may include adjusting the amplitude corresponding to some frequencies in the frequency-divided signal. Specifically, in the case where the first frequency range and the second frequency range overlap, the signal processor may adjust the intensity (amplitude) of the sound signal corresponding to the frequency in the overlapping frequency range to avoid excessive volume in the overlapping frequency range in the subsequent output sound caused by the superposition of multiple sound signals.

In 240, the acoustic output apparatus 100 may convert the processed sound signal into a sound containing different frequency components, then propagate the converted signals outwards.

In some embodiments, the acoustic output apparatus 100 may output sound through the acoustic driver 140 and/or the acoustic driver 150. In some embodiments, the acoustic driver 140 (such as the transducer 143) may output a low-frequency sound only containing low-frequency sound components, and the acoustic driver 150 (such as the transducer 153) may output a high-frequency sound only containing high-frequency sound components.

In some embodiments, the acoustic driver 140 may propagate low-frequency sound through at least two first sound guiding holes 147, and the acoustic driver 150 may propagate high-frequency sound through at least two second sound guiding holes 157. The sound guiding hole may be a small hole formed on the acoustic output apparatus with a specific opening and allowing sound to pass. The shape of the sound guiding hole may include, but not limited to, one of a circle shape, an oval shape, a square shape, a trapezoid shape, a rounded quadrangle shape, a triangle shape, an irregular shape, or any combination thereof. In addition, the number of sound guiding holes connected to the acoustic driver 140 or 150 may not be limited to two, which may be an arbitrary value instead, for example, three, four, six, or the like. In some embodiments, the acoustic route between the same acoustic driver and its corresponding different sound guiding hole may be designed according to different situations. For example, by setting the shape and/or size of the first sound guiding hole (or the second sound guiding hole), or by setting a lumen structure or acoustically damping material with a certain damping in the acoustic route, the acoustic route between the same acoustic driver and its corresponding different sound guiding hole may be configured to have approximately same equivalent acoustic impedance. In this case, as the same acoustic driver outputs two groups of sounds with the same amplitude and opposite phases, these two groups of sound may still have the same amplitude and opposite phase when they reach the corresponding sound guiding hole through different acoustic routes.

In combination with the structure of the acoustic output apparatus described in FIG. 4, the acoustic driver 140 may propagate two groups of low-frequency sound signals with opposite phases through the first sound guiding holes of the front chamber and the rear chamber. The acoustic driver 150 may output two groups of high-frequency sound signals with opposite phases through the second sound guiding hole of the front chamber and the rear chamber, respectively. Based on this, the acoustic drivers 140 and 150 constitute a low-frequency two point sound sources and a high-frequency two point sound sources, respectively. In this way, based on the principle of acoustic interference cancellation, the low-frequency two point sound sources (or high-frequency two point sound sources) far-field leakage may be reduced.

Further considering that the wavelength of the low-frequency sound is longer than that of the high-frequency sound, and in order to reduce the interference cancellation of the sound in the near-field (for example, the position of the user's ear), the distance between the first sound guiding holes and the distance between the second sound guiding holes may be set to be different values. In some embodiments, as the first distance between the two first sound guiding holes corresponding to the low-frequency acoustic driver 140 becomes larger, the increase of the near-field listening volume of the acoustic output apparatus is greater than the increase of the far-field sound leakage, which may enhance near-field sound and suppress lower far-field leakage in the low-frequency range. In addition, the second distance between the two second sound guiding holes corresponding to the high-frequency acoustic driver 150 is reduced. Although it may affect the near-field volume in the high-frequency range to some extent, it may significantly reduce the far-field leakage in the high-frequency range. Therefore, by properly designing the distance between the high-frequency two point sound sources (i.e., the two second sound guiding holes) and the distance between the low-frequency two point sound sources (i.e., the two first sound guiding holes), which may make the two point sound sources more powerful than the single point sound source (corresponding to a single sound guiding hole) in reducing leakage. For comparison of the leakage intensity of single point sound source and double-point sound source, please refer to FIG. 2 and the descriptions thereof.

For the purpose of illustration, there is a first distance of the two first sound guiding holes and a second distance of the two second sound guiding holes, and the first distance may be longer than the second distance. In some embodiments, the first distance and the second distance may be arbitrary values. Merely by way of example, the first distance may not be shorter than 8 mm, the second distance may not be longer than 12 mm, and the first distance may be longer than the second distance. Preferably, the first distance may not be shorter than 10 mm, the second distance may not be longer than 12 mm, and the first distance may be greater than the second distance. More preferably, the first distance may not be shorter than 12 mm, and the second distance may not be longer than 10 mm. More preferably, the first distance may not be shorter than 15 mm, and the second distance may not be longer than 8 mm. More preferably, the first distance may not be shorter than 20 mm, and the second distance may not be longer than 8 mm. More preferably, the first distance may not be shorter than 30 mm, and the second distance may not be longer than 7 mm. Further preferably, the first distance may be in a range of 20 mm-40 mm, and the second distance may be in a range of 3 mm-7 mm. As another example, the first distance may be at least twice the second distance. Preferably, the first distance may be at least three times the second distance. Preferably, the first distance may be at least 5 times the second distance.

In some alternative embodiments, other feasible methods may be used to adjust the parameters of the two point sound sources to improve the acoustic output apparatus and reduce the far-field sound leakage capability, which is not limited by the present disclosure. For example, the amplitude of each point of the two point sound sources may be adjusted (that is, the amplitude of the sound at each sound guiding hole) so that the amplitude of each point of the two point sound sources is not exactly same. As another example, the phase difference between two point sound sources of may be adjusted. Preferably, in order to achieve a better leakage reduction effect, the phase difference between the two point sound sources may be 180 degrees (that is, the sounds output at the two sound guiding holes have opposite phases). In some other embodiments, the sounds output by the two point sound sources may have other amplitude or phase relationships. In some embodiments, more groups of different frequency components may also be output through multiple groups of two point sound sources.

It should be noted that the description of the process 200 is for example and illustration only, and does not limit the scope of application of the present disclosure. For those skilled in the art, various modifications and changes may be made to the process 200 under the guidance of the present disclosure. However, these amendments and changes are still within the scope of the present disclosure. For example, the frequency-divided signal processing in operation 230 may be omitted, and the frequency-divided signal may be directly output to the external environment through a sound guiding hole. As another example, operation 230 may be performed before operation 220, that is, first perform signal processing on the sound source signal, and then perform frequency division. In some embodiments, the acoustic output apparatus 100 may utilize a transducer in the acoustic driver to achieve signal frequency division (e.g., transducer 143 and/or 153). For example, the acoustic output apparatus 100 may be provided with a low-frequency speaker unit and a high-frequency speaker unit having different frequency response characteristics. The low-frequency speaker unit may directly convert the sound source signal into a sound only containing low-frequency components, and the high-frequency speaker unit may directly convert the sound source signal into a sound only containing high-frequency components. In some embodiments, the acoustic output apparatus 100 may utilize acoustic routes to achieve signal frequency division (e.g., acoustic route 145 and/or 155). For example, the acoustic output apparatus 100 may set the frequency selection characteristics of the acoustic route (e.g., the acoustic route 145 may pass low-frequency sound but block high-frequency sound, the acoustic route 155 may pass high-frequency sound but block low-frequency sound). The sound generated by the acoustic driver passed the acoustic route with low-pass characteristics may become a low-frequency sound. The sound generated by the acoustic driver passed the acoustic route with high-pass characteristics may become high-frequency sound. In some embodiments, the frequency division processing of the sound source signal may be implemented by the combination of the two or more ways. Optionally, the frequency division processing of the sound source signal may also be implemented through other feasible ways, which is not limiting in the present disclosure.

Figure 6A:
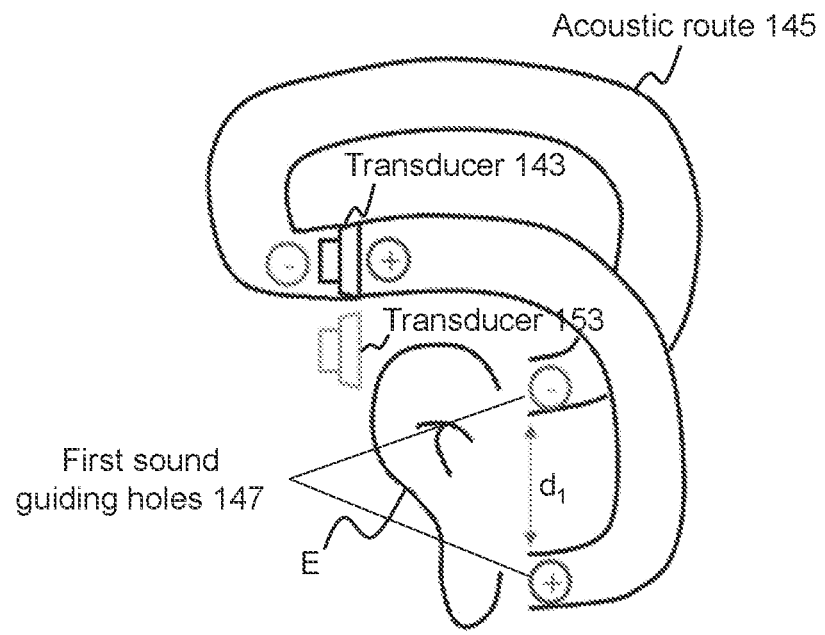
FIG. 6A is a schematic diagram illustrating an exemplary acoustic output apparatus according to some embodiments of the present disclosure.
Figure 6B:
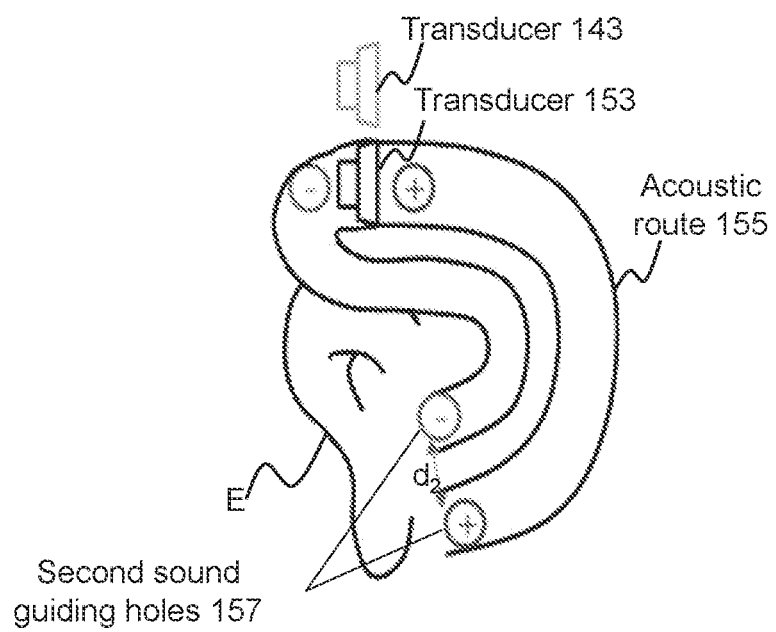
FIG. 6B is a schematic diagram illustrating an exemplary acoustic output apparatus according to some embodiments of the present disclosure.

FIG. 6A is a schematic diagram illustrating an exemplary acoustic output apparatus according to some embodiments of the present disclosure. FIG. 6B is a schematic diagram illustrating an exemplary acoustic output apparatus according to some embodiments of the present disclosure.

FIGS. 6A and 6B illustrate simplified representations of an acoustic driver in the acoustic output apparatus. For the purpose of illustration, the outward propagating sound formed by the same transducer coupled with different sound guiding holes may be described as an example. In FIG. 6A and FIG. 6B, each transducer may have a front side and a rear side, and corresponding front chamber (i.e., the first acoustic route) and rear chamber (i.e., the second acoustic route) structures may exist on the front or rear side of the transducer, respectively. In some embodiments, these structures may have the same or approximately the same equivalent acoustic impedance, such that the transducers may be loaded symmetrically. The symmetrical load of the transducer may form sound sources satisfy an amplitude and phase relationship at different sound guiding holes (such as the "two point sound sources" having the same amplitude and opposite phases as described above), such that a specific sound field may be formed in high-frequency and/or low-frequency (for example, the near-field sound may be enhanced and the far-field leakage may be suppressed).

As shown in FIGS. 6A and 6B, the acoustic driver (for example, the acoustic driver 140 or 150) may include transducers, and acoustic routes and sound guiding holes connected to the transducer. In order to describe the actual application scenarios of the acoustic driver more clearly, a position of the user's ear E may also be shown in FIGS. 6A and 6B for the explanation. FIG. 6A illustrates an application scenario of the acoustic driver 140. The acoustic driver 140 may include a transducer 143, and the transducer 143 may be coupled with two first sound guiding holes 147 through an acoustic route 145. FIG. 6B illustrates an application scenario of the acoustic driver 150. The acoustic driver 150 may include a transducer 153, and the transducer 153 may be coupled with two second sound guiding holes 157 through an acoustic route 155.

The transducer 143 or 153 may vibrate under the driving of an electric signal, and the vibration may generate sound with equal amplitudes and opposite phases (180 degrees inversion). The type of transducer may include, but not limited to, one of an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 143 or 153 may include a vibration diaphragm, which may vibrate when driven by an electrical signal, and the front and rear sides of the vibration diaphragm may simultaneously output a normal-phase sound and a reverse-phase sound. In FIGS. 6A and 6B, "+" and "−" may be used to exemplify sounds with different phases, wherein "+" may represent a normal-phase sound, and "−" may represent a reverse-phase sound.

In some embodiments, the transducer may be encapsulated by a casing on a supporting structure, and the interior of the casing may be provided with sound channels connected to the front and rear sides of the transducer, respectively, thereby forming an acoustic route. For example, the front cavity of the transducer 143 may be coupled to one of the two first sound guiding holes 147 through a first acoustic route (i.e., the first half of the acoustic route 145), and the rear cavity of the transducer 143 may acoustically be coupled to the other sound guiding hole of the two first sound guiding holes 147 through a second acoustic route (i.e., the second half of the acoustic route 145). Normal-phase sound and reverse-phase sound that output from the transducer 143 may be output from the two first sound guiding holes 147, respectively. As another example, the front cavity of the transducer 153 may be coupled to one of the two sound guiding holes 157 through a third acoustic route (i.e., the first half of the acoustic route 155), and the rear cavity of the transducer 153 may be coupled to another sound guiding hole of the two second sound guiding holes 157 through a fourth acoustic route (i.e., the second half of the acoustic route 155). The normal-phase sound and the reverse-phase sound output from the transducer 153 may be output from the two second sound guiding holes 157, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5 MKS Rayleigh to 500 MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the sound guiding holes with the same size or shape, etc., may be used.

The distance between the two first sound guiding holes 147 of the low-frequency acoustic driver may be expressed as $d_1$ (i.e., the first distance). The distance between the two second sound guiding holes 157 of the high-frequency acoustic driver may be expressed as $d_2$ (i.e., the second distance). By setting the distance between the sound guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first sound guiding holes 147 is greater than the distance between the two second sound guiding holes 157 (i.e., $d_1 > d_2$).

In some embodiments, the transducer 143 and the transducer 153 may be housed together in a housing of an acoustic output apparatus, and be placed in isolation in a structure of the casing.

In some embodiments, the acoustic output apparatus 100 may include multiple sets of high-frequency acoustic drivers and low-frequency acoustic drivers. For example, the acoustic output apparatus 100 may include a group of high-frequency acoustic drivers and a group of low-frequency acoustic drivers for simultaneously outputting sound to the left and/or right ears. As another example, the acoustic output apparatus may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values. It should be noted that the above description of the components of the acoustic output apparatus 100 is for convenience of description only, and cannot limit the present disclosure to be within the scope of the illustrated embodiment. It may be understood that, for those skilled in the art, after understanding the principle of the apparatus, it is possible to combine each unit or form a substructure to connect with other units arbitrarily without departing from this principle. For example, the supporting structure of the acoustic output apparatus 100 may be band-shaped, which is convenient for users to wear on the head.

Figure 7A:
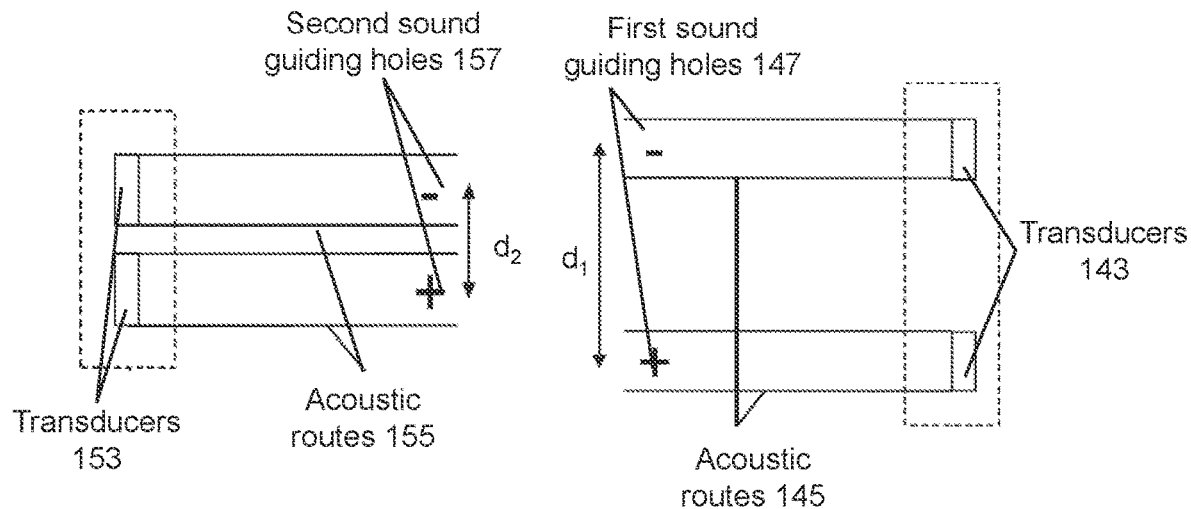
FIG. 7A is a schematic diagram illustrating a process for sound output according to some embodiments of the present disclosure.
Figure 7B:
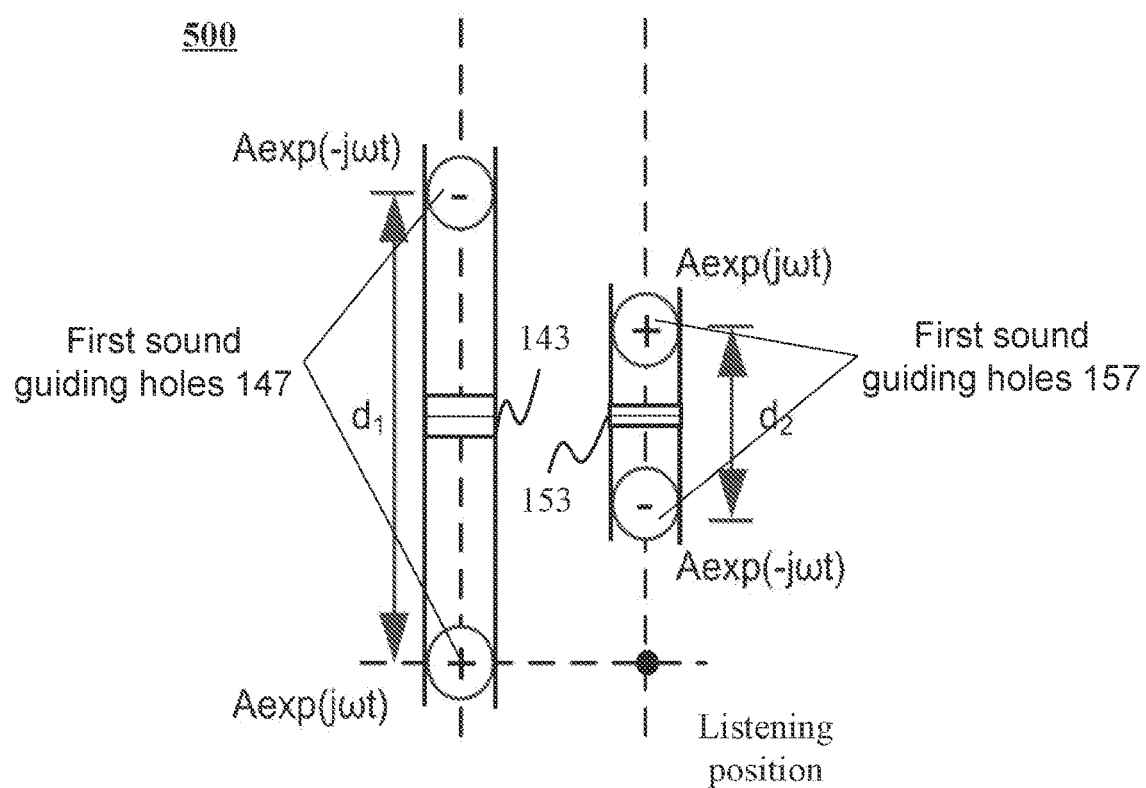
FIG. 7B is a schematic diagram illustrating another process for sound output according to some embodiments of the present disclosure.

FIG. 7A is a schematic diagram illustrating a process for sound output according to some embodiments of the present disclosure. FIG. 7B is a schematic diagram illustrating another process for sound output according to some embodiments of the present disclosure.

In some embodiments, the acoustic output apparatus may generate sounds in the same frequency range through two or more transducers, and the sounds may propagate outwards through different sound guiding holes. In some embodiments, different transducers may be controlled by the same or different controllers, respectively, and may produce sounds that satisfy certain phase and amplitude conditions (for example, sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as the low-frequency acoustic driver 140 and the high-frequency acoustic driver 150) may be arranged side by side in an acoustic output apparatus, one of which may be used to output normal-phase sound, and the other may be used to output reverse-phase sound. As shown in FIG. 7A, the acoustic driver 140 on the right may include two transducers 143, two acoustic routes 145, and two first sound guiding holes 147. The acoustic driver 150 on the left may include two transducers 153, two acoustic routes 155, and two second sound guiding holes 157. Driven by electrical signals with opposite phases, the two transducers 143 may generate a set of low-frequency sounds with opposite phases (180 degrees inversion). One of the two transducers 143 may output normal-phase sound (such as the transducer located below), and the other may output reverse-sound (such as the transducer located above). The two sets of low-frequency sounds with opposite phases may be transmitted to the two first sound guiding holes 147 along the two acoustic routes 145, respectively, and propagate outwards through the two first sound guiding holes 147. Similarly, driven by electrical signals with opposite phases, the two transducers 153 may generate a set of high-frequency sounds with opposite phases (180 degrees inversion). One of the two transducers 153 may output normal-phase high-frequency sound (such as the transducer located below), and the other may output a reverse-phase high-frequency sound (such as the transducer located above). The high-frequency sound with opposite phases may be transmitted to the two second sound guiding holes 157 along the two acoustic routes 155, respectively, and propagate outwards through the two second sound guiding holes 157.

In some embodiments, the two transducers in the acoustic driver (for example, the low-frequency acoustic driver 140 and the high-frequency acoustic driver 150) may be arranged relatively close to each other along the same straight line, and one of them may be used to output a normal-phase sound and the other may be used to output a reverse-sound. As shown in FIG. 7B, the left side may be the acoustic driver 140, and the right side may be the acoustic driver 150. The two transducers 143 of the acoustic driver 140 may generate a set of low-frequency sounds of equal amplitude and opposite phases under the control of the controller, respectively. One of the transducers may output normal low-frequency sound, and transmit the normal low-frequency sound along a first acoustic route to a first sound guiding hole. The other transducer may output reverse-phase low-frequency sound, and transmit the reverse-phase low-frequency sound along the second acoustic route to another first sound guiding hole. The two transducers 153 of the acoustic driver 150 may generate high-frequency sound of equal amplitude and opposite phases under the control of the controller, respectively. One of the transducers may output normal-phase high-frequency sound, and transmit the normal-phase high-frequency sound along a third acoustic route to a second sound guiding hole. The other transducer may output reverse-phase high-frequency sound, and transmit the reverse-phase high-frequency sound along the fourth acoustic route to another second sound guiding hole.

In some embodiments, the transducer 143 and/or the transducer 153 may be of various suitable types. For example, the transducer 143 and the transducer 153 may be dynamic coil speakers, which may have the characteristics of a high sensitivity in low-frequency, a large dive depth of low-frequency, and a small distortion. As another example, the transducer 143 and the transducer 153 may be moving iron speakers, which may have the characteristics of a small size, a high sensitivity, and a large high-frequency range. As another example, the transducers 143 and 153 may be air-conducted speakers, or bone-conducted speakers. As another example, the transducer 143 and the transducer 153 may be balanced armature speakers. In some embodiments, the transducer 143 and the transducer 153 may be different types of transducers. For example, the transducer 143 may be a moving iron speaker, and the transducer 153 may be a moving coil speaker. As another example, the transducer 1043 may be a moving coil speaker, and the transducer 1053 may be a moving iron speaker.

In FIGS. 7A and 7B, the distance between the two point sound sources of the acoustic driver 140 may be $d_1$, and the distance between the two point sound sources of the acoustic driver 150 may be $d_2$, and $d_1$ may be greater than $d_2$. As shown in FIG. 7B, the listening position (that is, the position of the ear canal when the user wears an acoustic output apparatus) may be located on a line of a set of two point sound sources. In some alternative embodiments, the listening position may be any suitable position. For example, the listening position may be located on a circle centered on the center point of the two point sound sources. As another example, the listening position may be on the same side of two sets two point sound sources connection, or in the middle of the two sets two point sound sources connection.

It may be understood that the simplified structure of the acoustic output apparatus shown in FIGS. 7A and 7B may be merely by way of example, which may be not a limitation for the present disclosure. In some embodiments, the acoustic output apparatus 400 and/or 500 may include a supporting structure, a controller, a signal processor, or the like, or any combination thereof.

Figure 8A:
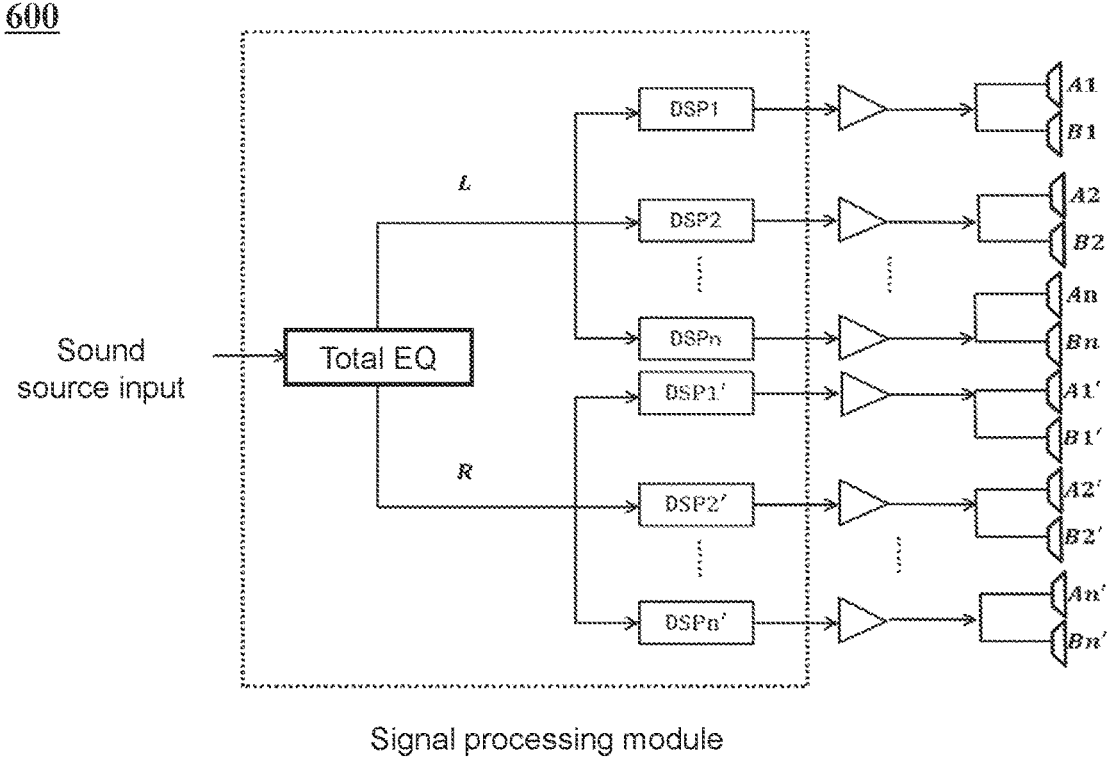
FIG. 8A is a schematic diagram illustrating an acoustic output apparatus according to some embodiments of the present disclosure.
Figure 8B:
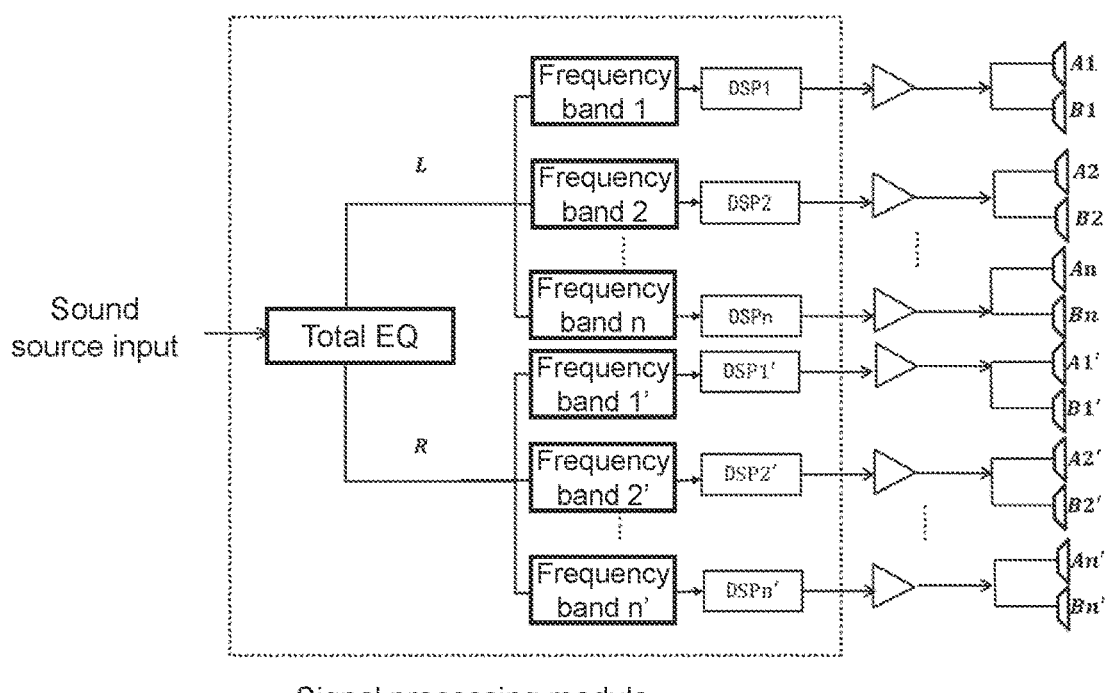
FIG. 8B is a schematic diagram illustrating another acoustic output apparatus according to some embodiments of the present disclosure.

FIG. 8A is a schematic diagram illustrating an acoustic output apparatus according to some embodiments of the present disclosure. FIG. 8B is a schematic diagram illustrating another acoustic output apparatus according to some embodiments of the present disclosure.

In some embodiments, acoustic drivers (e.g., acoustic drivers 140 or 150) may include multiple groups of narrow-band speakers. As shown in FIG. 8A, the acoustic output apparatus may include a plurality of groups of narrow-band speaker units and a signal processing module. On the left or right side of the user, the acoustic output apparatus may include n groups, respectively, with a total number of 2n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 8A as an example: $A_1 \sim A_n$ and $B_1 \sim B_n$ form n groups of two point sound sources, respectively. When the same electrical signal is an input, each two point sound sources may generate sound with different frequency ranges. By setting the distance $d_n$ of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing module may include an Equalizer (EQ) processing module, and a Digital Signal Processor (DSP) processing module. The signal processing module may be used to implement signal equalization and other general digital signal processing algorithms (such as amplitude modulation and equal modulation). The processed signal may output sound by being connected to a corresponding acoustic driver (for example, a narrow-band speaker) structure. Preferably, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as acoustic drivers 140 or 150) may include multiple groups of full-band speakers. As shown in FIG. 8B, the acoustic output apparatus may include a plurality of sets of full-band speaker units and a signal processing module. On the left or right side of the user, the acoustic output apparatus may include n groups, respectively, with a total number of 2×n full-band speaker units. Each full-band speaker unit may have the same or similar frequency response curve, and may cover a wide frequency range.

Taking the speaker unit located on the left side of the user as shown in FIG. 8B as an example: $A_1 \sim A_n$ and $B_1 \sim B_n$ form n two point sound sources, respectively. The difference from FIG. 8A may be that the signal processing module in FIG. 8B may include at least one set of filters for frequency division of the sound source signal, and the electric signals corresponding to different frequency ranges may be input into each group of full-band speakers. In this way, each group of speaker units (similar to the two point sound sources) may produce sounds with different frequency ranges separately.

Figure 9A:
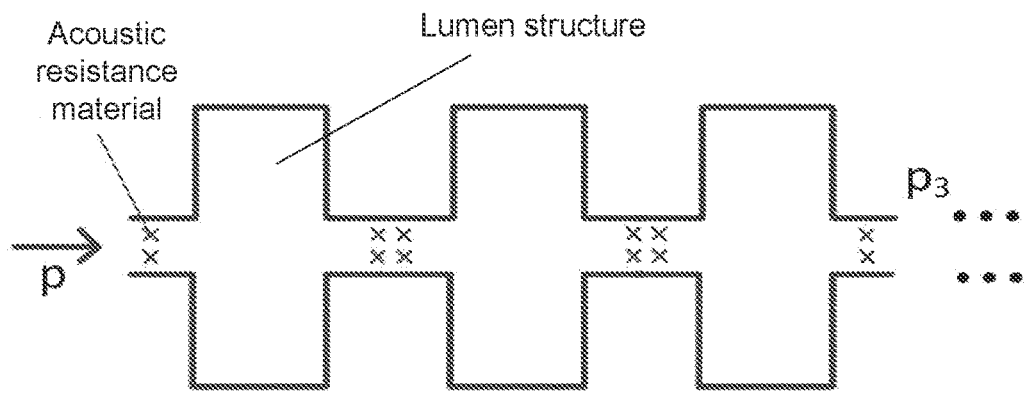
FIG. 9A is a schematic diagram illustrating an acoustic route according to some embodiments of the present disclosure.
Figure 9B:
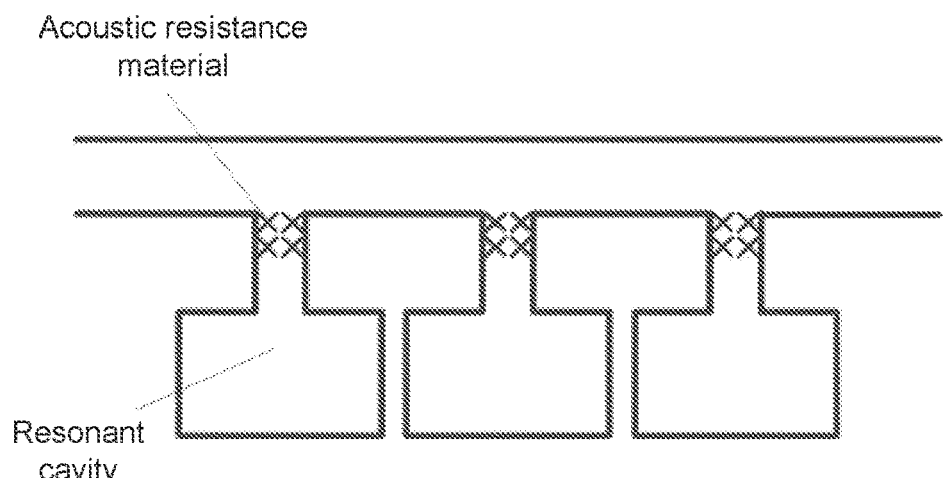
FIG. 9B is a schematic diagram illustrating another acoustic route according to some embodiments of the present disclosure.
Figure 9C:
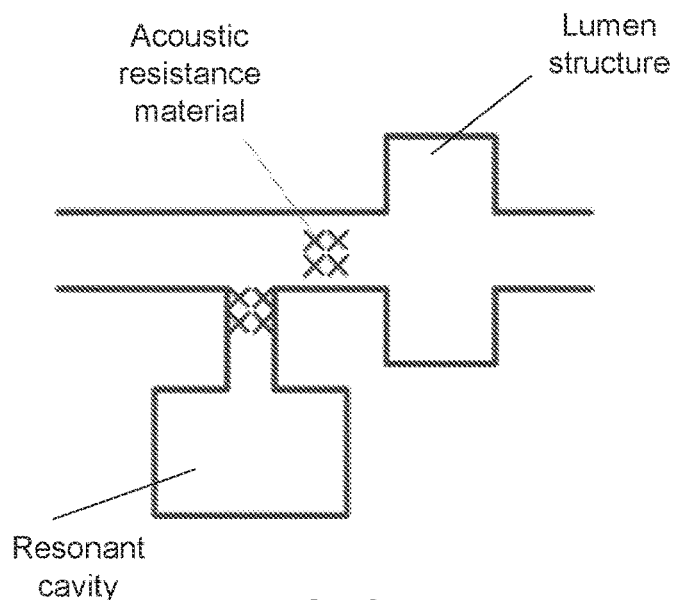
FIG. 9C is a schematic diagram illustrating a further acoustic route according to some embodiments of the present disclosure.

FIG. 9A is a schematic diagram illustrating an acoustic route according to some embodiments of the present disclosure. FIG. 9B is a schematic diagram illustrating another acoustic route according to some embodiments of the present disclosure. FIG. 9C is a schematic diagram illustrating a further acoustic route according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 9A-9C show a schematic structural diagram of frequency division of a sound signal using an acoustic route. It should be noted that FIGS. 9A-9C may be examples of setting the acoustic route when using the acoustic route to divide the sound signal, and may not be a limitation on the present disclosure.

As shown in FIG. 9A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 9B, a structure with one or more sets of resonant cavities (for example, Helmholtz cavity) may be constructed on the acoustic route branch, and the filtering effect may be achieved by adjusting the size of each structure and the acoustic resistance material. As shown in FIG. 9C, a combination of a lumen and a resonant cavity (for example, a Helmholtz cavity) structure may be constructed in an acoustic route, and a filtering effect may be achieved by adjusting the size of each structure and the acoustic resistance material.

Figure 10:
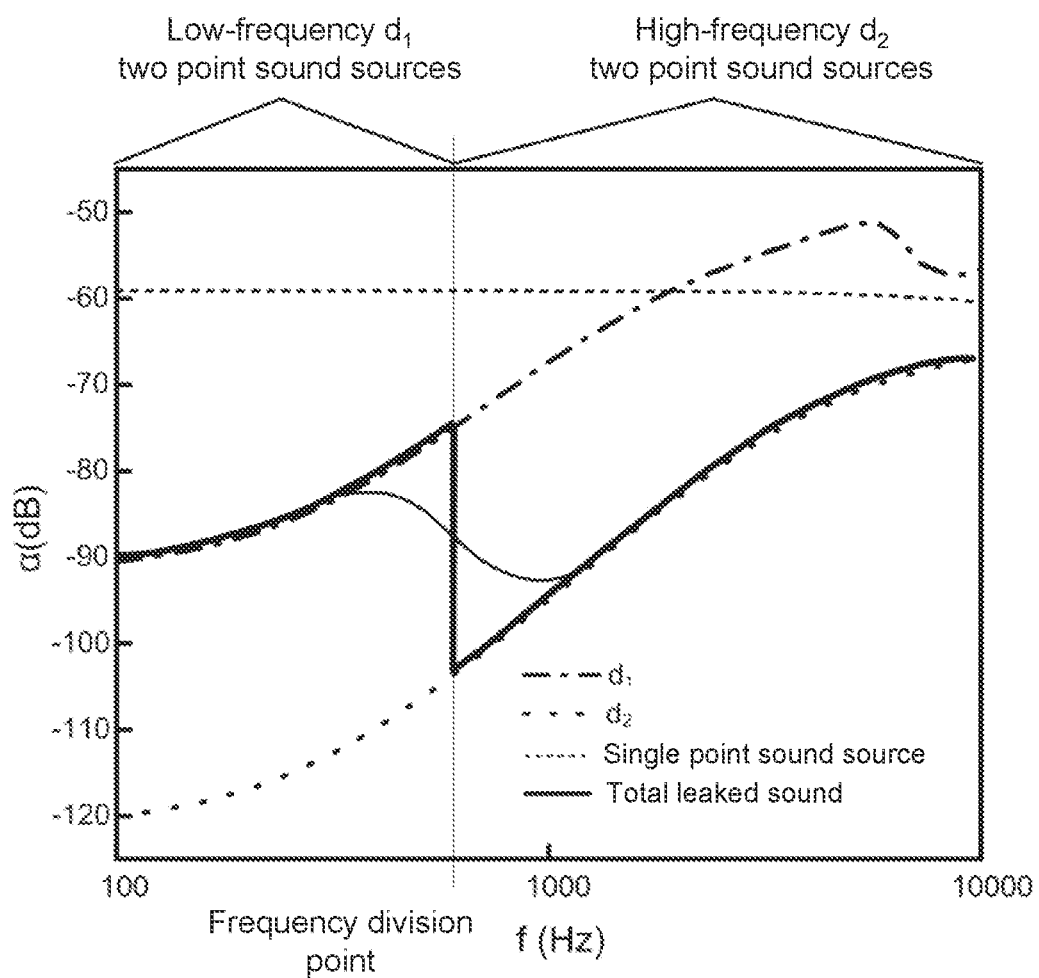
FIG. 10 is an exemplary graph illustrating the sound leakage under a combined action of two sets of two point sound sources according to some embodiments of the present disclosure.

FIG. 10 is an exemplary graph illustrating the sound leakage under a combined action of two sets of two point sound sources according to some embodiments of the present disclosure.

FIG. 10 shows a curve of the sound leakage of an acoustic output apparatus (for example, the acoustic output apparatus 100, the acoustic output apparatus 400, the acoustic output apparatus 500, the acoustic output apparatus 600) under the combined action of two sets of two point sound sources (a group of high-frequency two point sound sources and a group of low-frequency two point sound sources). The frequency division points of the two sets of two point sound sources may be around 700 Hz.

The normalization parameter a may be used to evaluate the volume of the leaked sound (for calculation of a, see Equation (4)). As shown in FIG. 10, compared with the case of a single point sound source, the two point sound sources may have a stronger ability to reduce sound leakage. In addition, compared with the acoustic output apparatus provided with only one set of two point sound sources, the two sets of two point sound sources may output high-frequency sounds and low-frequency sounds, separately, The distance between the low-frequency two point sound sources may be greater than that of the high-frequency two point sound sources. In the low-frequency range, by setting a larger two point sound sources distance ($d_1$), the increase in the volume of the near-field sound may be greater than the increase in the volume of the far-field leakage, and may achieve a higher volume of the near-field sound output in the low-frequency band. At the same time, in the low-frequency range, the sound leakage of the two point sound sources may originally be very small. After the distance between the two point sound sources is increased, the slightly increased sound leakage may still maintain a low level. In the high-frequency range, by setting a small distance ($d_2$) of the two point sound sources, the problems of the cutoff frequency of high-frequency sound leakage reduction being too low and the audio band of the sound leakage reduction being too narrow may be overcome. Therefore, by setting the distance $d_1$ of the two point sound sources in the low-frequency band and the distance $d_2$ of the two point sound sources in the high-frequency band, the acoustic output apparatus provided in the embodiments of the present disclosure may obtain a stronger sound leakage suppressing capability than a single point sound source and a set of two point sound sources.

In some embodiments, affected by factors such as the filter characteristics of the actual circuit, the frequency characteristics of the transducer, and the frequency characteristics of the acoustic channel, the actual low-frequency and high-frequency sounds of the acoustic output apparatus may differ from those shown in FIG. 10. In addition, low-frequency and high-frequency sounds may have a certain crossover (aliasing) in the frequency band near the frequency division point, causing the total sound leakage reduction of the acoustic output apparatus not to have a mutation at the frequency division point as shown in FIG. 10. Instead, there may be gradients and transitions in the frequency band near the frequency division point, as shown in the thin solid line in FIG. 10. It may be understood that these differences may not affect the overall leakage reduction effect of the acoustic output apparatus provided by the embodiment of the present disclosure.

Figure 11:
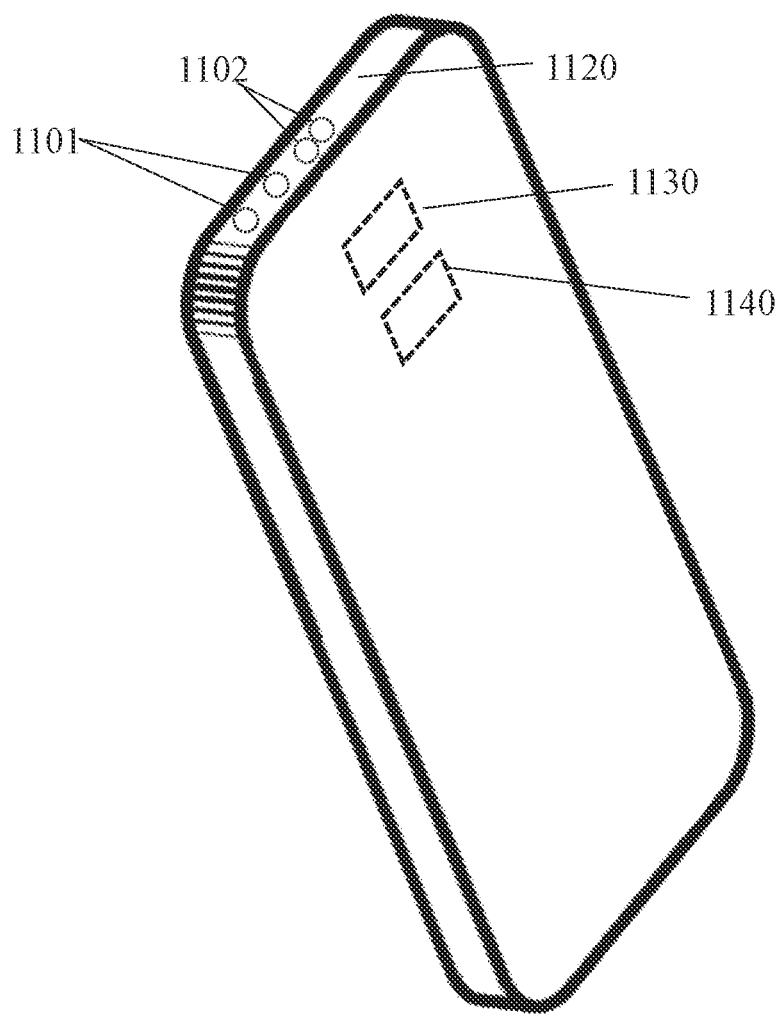
FIG. 11 is a schematic diagram illustrating a mobile phone with a plurality of sound guiding holes according to some embodiments of the present disclosure.

It needs to be known that the description of the present disclosure does not limit the actual use scenario of the acoustic output apparatus. The acoustic output apparatus may be any device or a part thereof that needs to output sound to a user. For example, the acoustic output apparatus may be applied on a mobile phone. FIG. 11 is a schematic diagram illustrating a mobile phone with a plurality of sound guiding holes according to some embodiments of the present disclosure. As shown in the figure, the top 1120 of the mobile phone 1100 (i.e., "vertical" to the upper-end face of the mobile phone display) is provided with a plurality of sound guiding holes as described elsewhere in the present disclosure. Merely by way of example, sound guiding holes 1101 may constitute a group of two point sound sources (or point sound source arrays) for outputting the low-frequency sounds. Two sound guiding holes 1102 may form another group of two point sound sources (or point source arrays) for outputting high-frequency sounds. The distance of the sound guiding holes 1101 may be longer than the distance of the sound guiding holes 1102. A low-frequency acoustic driver 1130 and a high-frequency acoustic driver 1140 are provided inside the casing of the mobile phone 1100. The low-frequency sound generated by the low-frequency acoustic driver 1130 may be transmitted outward through the sound guiding holes 1101, and the high-frequency sound generated by the high-frequency acoustic driver 1140 may be transmitted outward through the sound guiding holes 1102. According to other embodiments described in the present disclosure, when the user places the sound guiding holes 1101 and 1102 near the ear to answer the voice information, the sound guiding holes 1101 and 1102 may emit a strong near-field sound to the user, and at the same time may reduce leakage to the surrounding environment. Moreover, by setting up the sound guiding hole on the top of the phone, instead of the upper part of the display of the mobile phone, the space required to set up the sound guiding hole on the front of the phone may be saved, then the area of the mobile phone display may be further increased, the appearance of the phone more may also be concise and beautiful.

The above description of setting the sound guiding hole on the mobile phone is just for the purposes of illustration. Without departing from the principle, those skilled in the art may make adjustments to the structure, and the adjusted structure may still be within the protection scope of the present disclosure. For example, all or part of the sound guiding holes 1101 or 1102 may also be set on other positions of the mobile phone 1100. For example, the upper part of the back shell, the upper part of the side shell, etc., and these settings may still ensure that the user hears a large volume when receiving the sound information, and also prevents the sound information from leaking to the surrounding environment. As another example, low-frequency acoustic driver 1130 and/or high-frequency acoustic driver 1140 may not be necessary, and may also divide the sound output by the mobile phone 1100 through other methods described in the present disclosure, which will not be repeated here.

Beneficial effects of the present disclosure may include but not limited to: (1) a high-frequency two point sound sources and a low-frequency two point sound sources may be provided to output sound in different frequency bands, thereby achieving better acoustic output effect; (2) two point sound sources with different distances may be provided, such that the acoustic output apparatus may have a stronger capability to reduce sound leakage in higher frequency bands, which may meet requirements for an open binaural acoustic output apparatus. It should be noted that different embodiments may have different beneficial effects. In various embodiments, the acoustic output apparatus may have any one or a combination of the benefits exemplified above, and any other beneficial effects that can be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

Computer storage media may contain a transmitted data signal containing a computer program code, for example on baseband or as part of a carrier wave. The propagation signal may have multiple manifestations, including electromagnetic form, optical form, etc., or a suitable combination form. A computer storage medium may be any computer-readable medium other than a computer-readable storage medium, which may be connected to an instruction execution system, device, or device to enable communication, propagation, or transmission of a program for use. The program code located on a computer storage medium may be transmitted through any suitable medium, including radio, cable, fiber optic cable, RF, or similar media, or any combination of the media.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure method does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication and other materials cited herein, such as articles, books, instructions, publications, documents, etc., are hereby incorporated by reference in their entirety. Application history documents that are inconsistent or conflicting with the contents of the present application are excluded, and documents (currently or later attached to the present application) that limit the widest range of the scope of the present application are also excluded. It is to be noted that if the description, definition, and/or terminology used in the appended application of the present application is inconsistent or conflicting with the contents described in this application, the description, definition and/or terminology may be subject to the present application.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with

What is claimed is:

1. An acoustic output apparatus, comprising:
   at least one low-frequency acoustic driver that outputs sound in a first frequency range from at least two first sound guiding holes;
   at least one high-frequency acoustic driver that outputs sound in a second frequency range from at least two second sound guiding holes, wherein the second frequency range includes frequencies higher than the first frequency range;
   a supporting structure configured to carry the at least one high-frequency acoustic driver and the at least one low-frequency acoustic driver, wherein the low-frequency acoustic driver is packaged by a casing, the casing forms a front chamber and a rear chamber of the low-frequency acoustic driver, the front chamber of the low-frequency acoustic driver is acoustically coupled to one of the at least two first sound guiding holes, and the rear chamber is acoustically coupled to another one of the at least two first sound guiding holes, wherein the first frequency range is less than a first frequency threshold, the second frequency range is greater than a second frequency threshold, the first frequency threshold is lower than the second threshold; and
   an electronic frequency division module, configured to divide a frequency of a sound source signal to generate a low-frequency signal corresponding to the first frequency range and a high-frequency signal corresponding to the second frequency range, wherein the low-frequency signal corresponding to the first frequency range and the high-frequency signal corresponding to the second frequency range is generated based on a frequency division point, and the frequency division point is a frequency point corresponding to a volume of a leaked sound.

2. The acoustic output apparatus of claim 1, wherein there is a first distance of the two first sound guiding holes, there is a second distance of the two second sound guiding holes, and the first distance is greater than the second distance.

3. The acoustic output apparatus of claim 2, wherein the first distance is not greater than 40 mm, and the second distance is not greater than 7 mm.

4. The acoustic output apparatus of claim 2, wherein the first distance is at least two times greater than the second distance.

5. The acoustic output apparatus of claim 1, wherein the first frequency range includes frequencies below 650 Hz, and the second frequency range includes frequencies above 1000 Hz.

6. The acoustic output apparatus of claim 1,
   wherein the low-frequency signal drives the at least one low-frequency acoustic driver to generate sound, and the high-frequency signal drives the at least one high-frequency acoustic driver to generate sound.

7. The acoustic output apparatus of claim 6, wherein the electronic frequency division module comprises at least one of a passive filter, an active filter, an analog filter, or a digital filter.

8. The acoustic output apparatus of claim 1, wherein the at least one low-frequency acoustic driver includes a first transducer, and the at least one high-frequency acoustic driver includes a second transducer, wherein the first transducer and the second transducer have different frequency response characteristics.

9. The acoustic output apparatus of claim 8, wherein the first transducer includes a low-frequency speaker, and the second transducer includes a high-frequency speaker.

10. The acoustic output apparatus of claim 1, wherein the at least one low-frequency acoustic driver has a first power, the at least one high-frequency acoustic driver has a second power, and the first power is greater than the second power.

11. The acoustic output apparatus of claim 1, wherein a first acoustic route is formed between the at least one low-frequency acoustic driver and the at least two first sound guiding holes, a second acoustic route is formed between the at least one high-frequency acoustic driver and the at least two second sound guiding holes, and the first acoustic route and the second acoustic route have different frequency selection characteristics.

12. The acoustic output apparatus of claim 11, wherein the first acoustic route includes an acoustic resistance material, an acoustic impedance of the acoustic resistance is in a range from 5 MKS Rayleigh to 500 MKS Rayleigh.

13. The acoustic output apparatus of claim 11, wherein the at least two second sound guiding holes are located closer to the user's ear than the at least two first sound guiding holes.

14. The acoustic output apparatus of claim 13, wherein the front chamber of the high-frequency acoustic driver is acoustically coupled to one of the at least two second sound guiding holes, and the rear chamber of the high-frequency acoustic driver is acoustically coupled to another one of the at least two second sound guiding holes.

15. The acoustic output apparatus of claim 1, wherein the at least two first sound guiding holes and the at least two second sound guiding holes are positioned away from a user's ear.

16. The acoustic output apparatus of claim 1, wherein the at least two first sound guiding holes and the at least two second sound guiding holes are located on the supporting structure.

17. The acoustic output apparatus of claim 1, wherein the high-frequency acoustic driver is packaged by a casing, the casing forms a front chamber and a rear chamber of the high-frequency acoustic driver.

18. The acoustic output apparatus of claim 1, wherein the sound output from the at least two first sound guiding holes is in opposite phases.

19. The acoustic output apparatus of claim 1, wherein the sound output from the at least two second sound guiding holes is in opposite phases.

* * * * *